US005613103A

United States Patent [19]

Nobutani et al.

[11] Patent Number: 5,613,103

[45] Date of Patent: Mar. 18, 1997

[54] DISPLAY CONTROL SYSTEM AND METHOD FOR CONTROLLING DATA BASED ON SUPPLY OF DATA

[75] Inventors: Toshiyuki Nobutani; Kenzoh Ina, both of Yokohama; Masami Shimakura, Tokyo; Junichi Tanahashi, Yokohama; Kenichiro Ono, Kawasaki; Hajime Morimoto, Tokyo; Tatsuya Sakashita, Yokohama; Eiichi Matsuzaki, Kawasaki, all of Japan

[73] Assignee: Canon Kabushiki Kaisha, Tokyo, Japan

[21] Appl. No.: 62,216

[22] Filed: May 18, 1993

[30] Foreign Application Priority Data

| | | | |
|---|---|---|---|
| May 19, 1992 | [JP] | Japan | 4-126163 |
| May 19, 1992 | [JP] | Japan | 4-126165 |
| May 19, 1992 | [JP] | Japan | 4-126166 |

[51] Int. Cl.[6] .......... G06F 15/00

[52] U.S. Cl. .......... 395/501; 395/503; 395/514; 345/97; 345/87; 345/55

[58] Field of Search .......... 345/30, 38, 55, 345/87, 90, 97, 101, 205, 901, 84, 94; 395/162–166

[56] References Cited

U.S. PATENT DOCUMENTS

| | | | |
|---|---|---|---|
| 4,964,699 | 10/1990 | Inoue | 350/332 |
| 5,289,173 | 2/1994 | Numao | 345/87 |
| 5,298,913 | 3/1994 | Numao et al. | 345/97 |
| 5,301,269 | 4/1994 | Alcorn et al. | 395/158 |
| 5,359,344 | 10/1994 | Inoue et al. | 345/100 |

FOREIGN PATENT DOCUMENTS

| | | |
|---|---|---|
| 0368117 | 5/1990 | European Pat. Off. . |
| 0462541 | 12/1991 | European Pat. Off. . |
| 0537428 | 4/1993 | European Pat. Off. . |
| 62-76357 | 4/1987 | Japan . |

*Primary Examiner*—Mark R. Powell
*Assistant Examiner*—U. Chauhan
*Attorney, Agent, or Firm*—Fitzpatrick, Cella, Harper & Scinto

[57] ABSTRACT

A display controller includes a memory for storing data to be displayed on a display, a unit for supplying data to the memory, a first flag group for indicating a line on the display screen of the display corresponding to data supplied by the data supplying unit, a second flag group for indicating a plurality of the first flag groups, a detector for detecting the status of the display, a selector for selecting the first or second flag in accordance with the status of the display detected by the detector, and a display control unit for reading data designated by the first or second flag selected by the selector from the memory, and displaying the data on the display.

22 Claims, 30 Drawing Sheets

1601

1602

1603

1604

DISPLAY CONTROL SYSTEM AND METHOD FOR CONTROLLING DATA BASED ON SUPPLY OF DATA

BACKGROUND OF THE INVENTION

1. Field of the Invention

The present invention relates to a display control system and method, and more particularly to a display control system and method for controlling a display such as a ferroelectric liquid crystal display of the type having display elements capable of holding the data by applying an electric field or the like.

2. Related Background Art

Information processing systems have a display as a means for visually displaying information. As such displays, a CRT display is widely used.

For the control of a CRT display, the data write operation by a system CPU into a video memory as a display data buffer and the data read operation by a CRT controller from the video memory are executed independently.

With such control of a CRT display, both the data read/write operations are independent so that a program used by the information processing system is not required to consider the display timings at all, allowing to write the display data at an optional timing.

The screen of a CRT display has a certain degree of depth, increasing the dimension of the CRT display and hindering the compactness of it. The information processing system using a CRT display has therefore a poor degree of freedom with respect to the installation site, portability and the like.

A liquid crystal display (hereinafter called LCD) solves such problems, and provides the compactness (particularly, small depth of the display screen). Of various types of LCDs, there is a display using ferroelectric liquid crystal (FLC) cells (hereinafter called FLCD (FLC display)). One of the main features of FLCD is a function of holding the display data upon application of an electric field to the liquid crystal cells. Namely, FLCD has liquid crystal cells so thin that the elongated FLC molecules are oriented in the first or second stable direction depending upon the electric field application direction, maintaining the orientation even after the electric field is removed. Because of such bi-stable nature of FLC molecules, FLCD provides a memory function. The details of FLC and FLCD are described, for example, in Japanese Patent Application No. 62-76357 (U.S. Ser. No. 174,980 filed on Mar. 29, 1988).

Different from a CRT display or other liquid crystal displays, there is therefore a marginal time for the period of the refresh operation sequentially executed for FLCD, and in addition it is possible to execute a partial rewrite of updating only the changed display data on the display screen.

According to one approach to using such features, there is known a method wherein flags are prepared as many as the number of scan lines of the display screen, and when a data rewrite occurs in a VRAM, the corresponding flag is set to preferentially rewrite the scan line with the set flag.

It is necessary to control the display if the rewrite time of the scan line depends on a temperature. The display control, such as controlling the period of the refresh operation and the number of scan lines to be interlaced during the interlacing operation, is executed depending upon a change in the temperature.

The above conventional method requires to check the flags as many times as the number of scan lines of the display screen. It takes a lot of time to check the flags in the case of a high resolution display (for example, 1280 dots× 1024 dots of screen size), lowering the throughput of the display control.

Furthermore, because the scan line rewrite time depends on the temperature of a display and becomes long as the temperature lowers, the number of scan lines to be interlaced and the field frequency are increased to suppress flickers. In this case, the rewrite operation cannot be executed at high speed.

Interlacing has been used conventionally for displays such as CRT and LCD displays. This interlacing is used when the refresh rate is low. The quality of an image sequentially displayed on the display screen at the low refresh rate is degraded by image disturbance called flickers.

Interlacing is used to suppress this image disturbance phenomenon. As shown in FIG. 34, after displaying line 0, not the line 1 but the line delayed by several lines from line 0 is displayed. In the interlacing operation shown in FIG. 34, every fourth lines are displayed, namely, in the order of line 0, line 4, line 8, line 12, line 16, line 20, line 1, line 5, and etc. By displaying lines at an interval of some lines, an apparent display speed rises, preventing the image disturbance called flickers.

For a display such as an FLCD having a small number of display colors, a binarization process such as a dither process may sometimes become necessary. The binarization process is performed generally in units of a plurality of lines.

However, the above-described interlacing operation displays at an interval of some lines. Therefore, in the binarization process such as a dither process, complicated processing is required such as the preparation of buffers for the dither process, thereby lowering the processing speed and image quality and leading to high cost.

With high speed data rewrite (such as character scrolling), the above-described interlacing operation may cause fluttering of characters, degrading the image quality of characters.

In the case where a certain display unit such as a character line is rewritten by a FLCD, if the display unit is different from the partial rewrite unit, there is a time difference between partial rewrites, lowering the image quality to "fluttered image" display. Furthermore, a partial rewrite is executed even for unnecessary lines, lowering the processing speed.

SUMMARY OF THE INVENTION

It is an object of the present invention to access a display device having a temperature dependency of the rewrite performance at an optimum timing, by preparing a first rewrite flag register for the scan lines of the display screen along with one or more rewrite flag registers with greater redundancy connected in parallel with the first register, and selectively using the rewrite flag registers upon a change in the environment such as the temperature.

It is another object of the present invention to provide a high speed display and preventing the fluttered image by providing the interlacing operation performed by a plurality set of interlacing lines, the number of lines of one set corresponding to the size of a dither matrix in the vertical direction.

It is a further object of the present invention to prevent lowering the processing speed by making the display unit such as a character line display unit become equal to the partial rewrite display unit.

DETAILED DESCRIPTION OF THE PREFERRED EMBODIMENTS

Preferred embodiments of the present invention will be described in detail with reference to the accompanying drawings.

Figure 1:
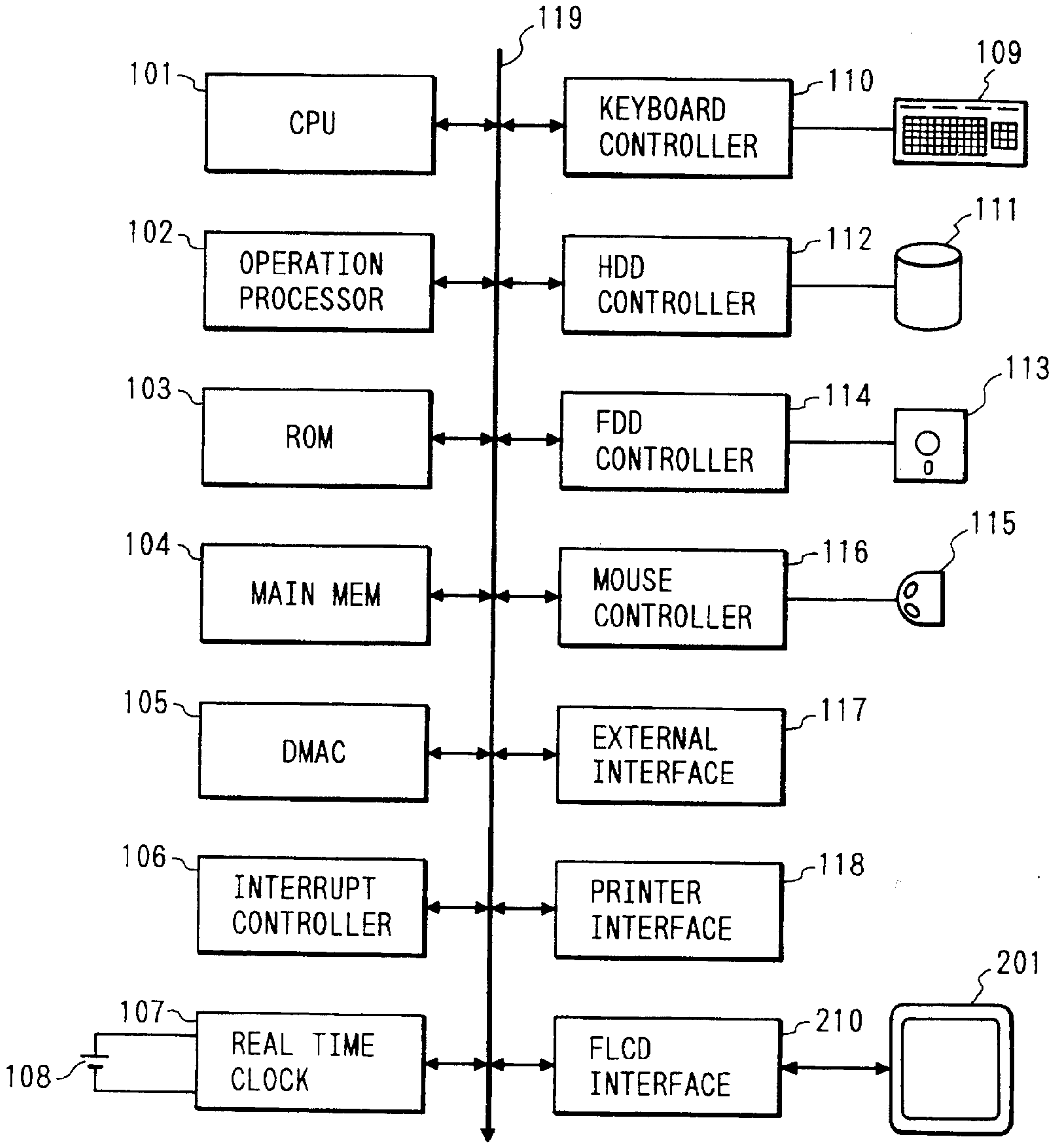
FIG. 1 is a block diagram of an information processing system equipped with a display controller according to the present invention.

FIG. 1 is a block diagram showing an information processing system equipped with a display controller according to an embodiment of the present invention.

In FIG. 1, reference numeral 101 represents a CPU for performing total control over the information processing system. Reference numeral 102 represents an operation processor which supports the arithmetic operation of CPU 101 at high speed. Reference numeral 103 represents a ROM which stores programs or the like for providing basic control functions of CPU 101. Reference numeral 104 represents a main memory which stores programs to be executed by CPU 101 and loaded from ROM 103, hard disk drive 111, or floppy disk drive 112 to be described later. The main memory 104 is also used as working areas for program execution.

Reference numeral 105 represents a direct memory access controller (hereinafter called DMAC) for the data transfer, without the control by CPU 101, between the main memory 104 and VRAM 212 to be described later, and between the main memory 104 or VRAM 212 and various devices constituting the system.

Reference numeral 106 represents an interrupt controller for controlling hardware interrupts issued by various devices constituting the system. Reference numeral 107 represents a real time clock including a CMOS RAM for storing calendars, clock information, non-volatile information.

Reference numeral 108 represents a back-up lithium battery powering the real time clock 107 while the system is not turned on. Reference numeral 109 represents a keyboard for entering character information of various types of characters and control information. Reference numeral 110 represents a keyboard controller for controlling the keyboard 109. Reference numeral 111 represents a hard disk drive (HDD) as an external storage device. Reference numeral 112 represents an HDD controller for controlling the data transfer between the system and HDD 111 and controlling other processing. Reference numeral 113 represents a floppy disk drive (FDD) as an external storage device. Reference numeral 114 represents an FDD controller for controlling the data transfer between the system and FDD 113 and controlling other processing. Reference numeral 115 represents a mouse as a pointing device. Reference numeral 116 represents a mouse controller for the signal transfer between the system and the mouse 115. Reference numeral 117 represents an external interface such as RS232C for the connection to an external input/output device. Reference numeral 118 represents a printer interface for the connection to an external printer and other external equipment.

Reference numeral 201 represents an FLC display (hereinafter called FLCD) having a display screen of ferroelectric liquid crystal. Reference numeral 210 represents an FLCD interface for controlling FLCD 201. Reference numeral 119 represents system busses including a data bus, control bus, and address bus for the information transfer between various devices.

(1st Embodiment)

Figure 2:
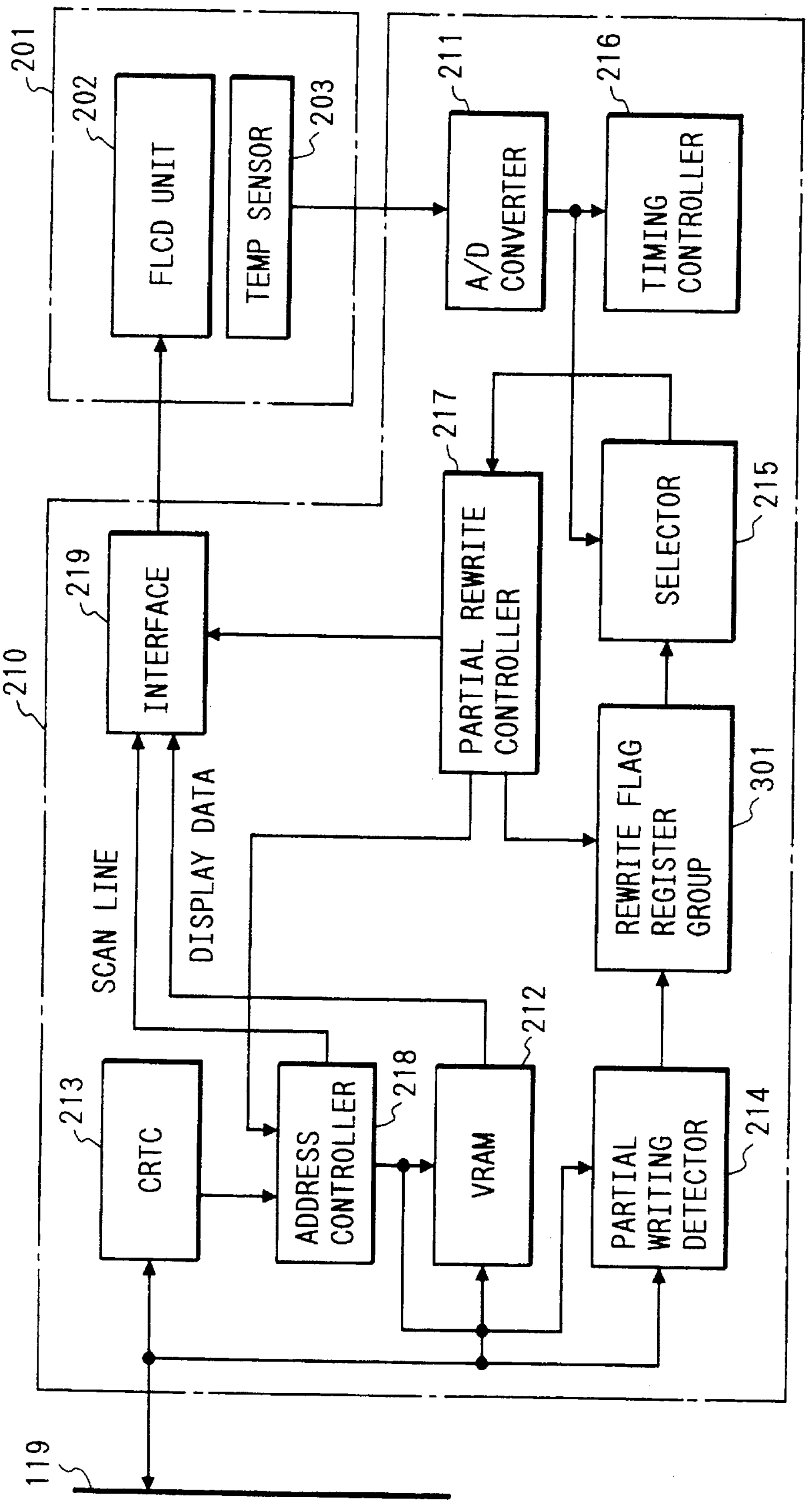
FIG. 2 is a block diagram showing the detail of the FLCD interface of the first embodiment.

FIG. 2 is a block diagram showing the detail of FLCD 201 and FLCD interface 210.

In FIG. 2, reference numeral 202 represents an FLCD unit which is a main constituent element of FLCD 201. Reference numeral 203 represents a temperature sensor for measuring one of the internal atmosphere temperature of FLCD 201 and the temperature of the FLCD unit 202, or both of them. Reference numeral 211 represents an A/D converter for converting an analog signal outputted from the temperature sensor 203 into a digital signal to be used by logic circuits.

Reference numeral 212 represents a VRAM for storing display data supplied from the system bus 119. This VRAM 212 has a capacity of bit information corresponding to pixels of the FLCD unit 202, each pixel having a plurality of bits in the case of color display or monochrome halftone display.

Reference numeral 213 represents a cathode ray tube controller (CRTC) for accessing mainly VRAM 212 and generating various timing signals in response to various control signals supplied from the system bus 19, connections lines to other than a line to an address controller 218 being omitted.

Reference numeral 214 represents a partial writing detector for detecting a change in the contents of VRAM 212 and identifying the scan lines of the FLCD unit 202 corresponding to the positions of the changed contents of VRAM 212. Reference numeral 301 represents a rewrite flag register group including a plurality of registers corresponding to scan lines of the FLCD unit 202. The flag register stores flag information indicating whether the data on which scan line is to be rewritten, in accordance with the information supplied from the partial writing detector 214. The flag register group will be detailed later.

Reference numeral 215 represents a selector for selecting outputs of one rewrite flag register from the rewrite flag register group 301. Reference numeral 216 represents a timing controller for determining the scan timing of the FLCD unit 202 in accordance with the temperature information supplied from the A/D converter 211 and for determining an interlace mode when no partial rewrite occurs, to control the internal elements of the FLCD unit 210. Connection lines to other elements are omitted.

Reference numeral 217 represents a partial rewrite controller for controlling the partial rewrite of the FLCD unit 202 in accordance with the flag information of the flag register selected by the selector 215. Reference numeral 218 represents an address controller for the arbitration of accesses to VRAM 212 between CRTC 213 and the partial rewrite controller 217. Reference numeral 219 represents an interface for receiving signals constituted by at least display data and scan line information supplied from the internal elements constituting the FLCD interface 210, and for sending the signals to FLCD 201.

Figure 3:
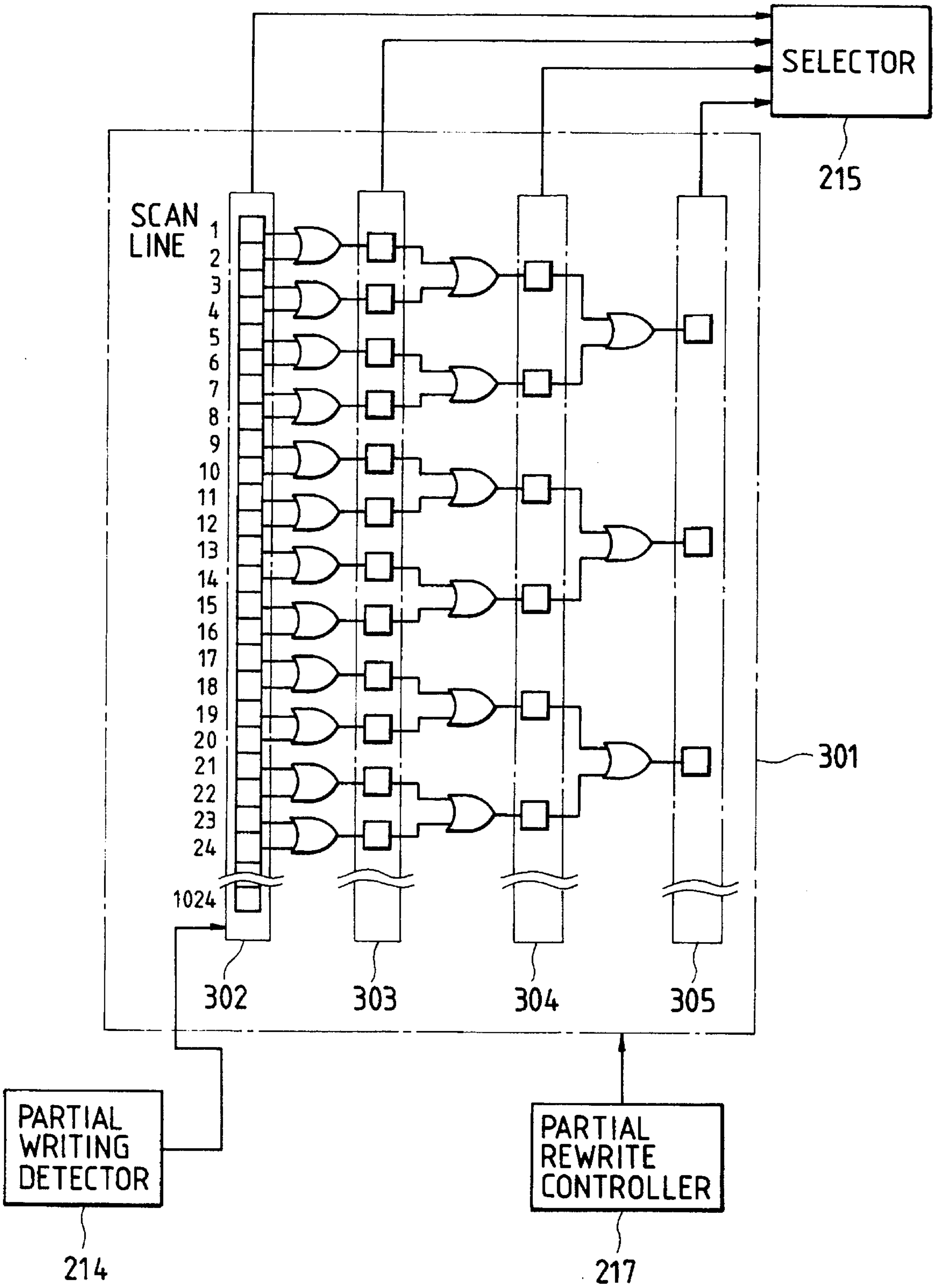
FIG. 3 is a conceptual diagram illustrating the rewrite flag register group of the first embodiment.

FIG. 3 is a conceptual diagram showing an example of the rewrite flag register group 301.

In FIG. 3, reference numeral 302 represents rewrite flag registers corresponding to scan lines of the FLCD unit 202. Any one of the rewrite flag registers may be set in accordance with the rewrite information from the partial writing detector 214, or all or particular ones of the flag registers may be cleared directly or indirectly under the control of the partial rewrite controller 217.

Reference numeral 303 represents rewrite flag registers. Each rewrite flag register 303 performs an OR logical operation between the flag values of the two consecutive rewrite flag registers 302, and sets the logical operation result as its flag value. Similar to the rewrite flag registers 302, all or particular ones of the flag registers 303 may be cleared directly or indirectly under the control of the partial rewrite controller 217.

Reference numeral 304 represents rewrite flag registers. Each rewrite flag register 304 performs an OR logical operation between the flag values of the two consecutive rewrite flag registers 303, and sets the logical operation result as its flag value. Similar to the rewrite flag registers 302, all or particular ones of the flag registers 304 may be cleared directly or indirectly under the control of the partial rewrite controller 217.

Reference numeral 305 represents rewrite flag registers. Each rewrite flag register 305 performs a logical operation between the flag values of the two consecutive rewrite flag registers 304, and sets logical operation result as its flag value. All or particular of the flag registers 305 may be cleared under the control of the partial controller 217.

The values of the rewrite flag registers 302 to 305 are selected by the selector 215 and outputted therefrom.

Figure 4:
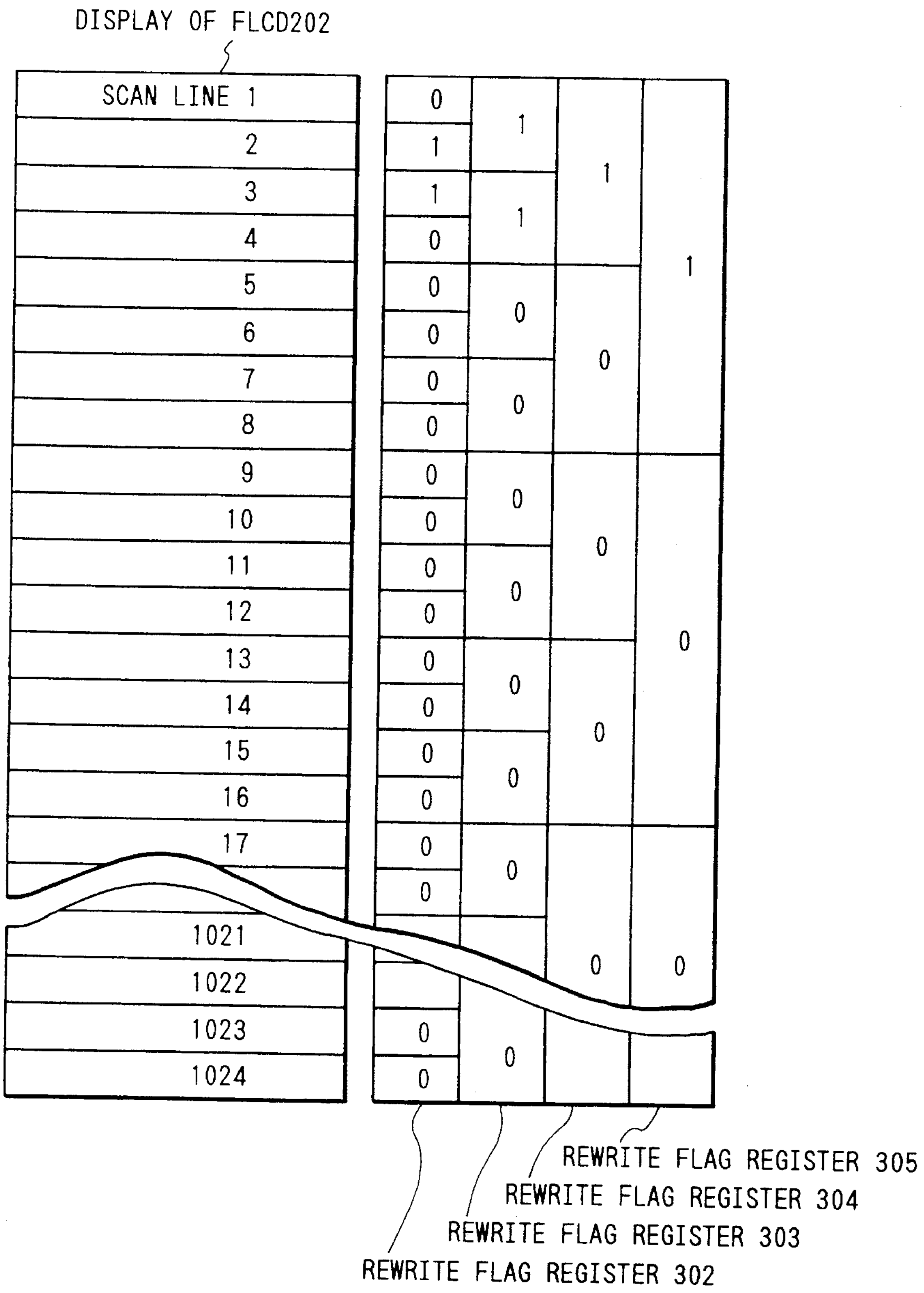
FIG. 4 is a conceptual diagram showing the relationship between the FLCD display screen and rewrite flag register group of the first embodiment.

FIG. 4 is a conceptual diagram showing the relationship between the display screen of FLCD 202 and the rewrite flag register group 301.

FIG. 4 shows the status of all flags wherein scan lines Nos. 2 and 3 on the display screen of FLCD 202 were rewritten, and so the flags of the rewrite flag registers 302 corresponding to the scan lines Nos. 2 and 3 are turned on ("1" in the rewrite flag registers 302) and the flags of the corresponding rewrite flag registers 303, 304, and 305 are turned on.

In FIG. 4, the area occupied by a bit of each register of the rewrite flag register group 301 is not related directly to the number of scan lines on the display screen.

Referring to FIG. 2, if no data write occurs in VRAM 212, CRTC 213 controls the internal elements of the FLCD interface 210 to send the display data to FLCD 201. In this case, CRTC 213 accesses VRAM 212 via the address controller 218. The display data read from VRAM 212 along with the scan line information is supplied via the interface 219 to FLCD 201. The scan line information supplied to FLCD 201 is not fixed interlace information, but it contains the information allowing to identify the addresses of desired scan lines on the display screen because the partial rewrite to be later described becomes necessary.

Figure 5:
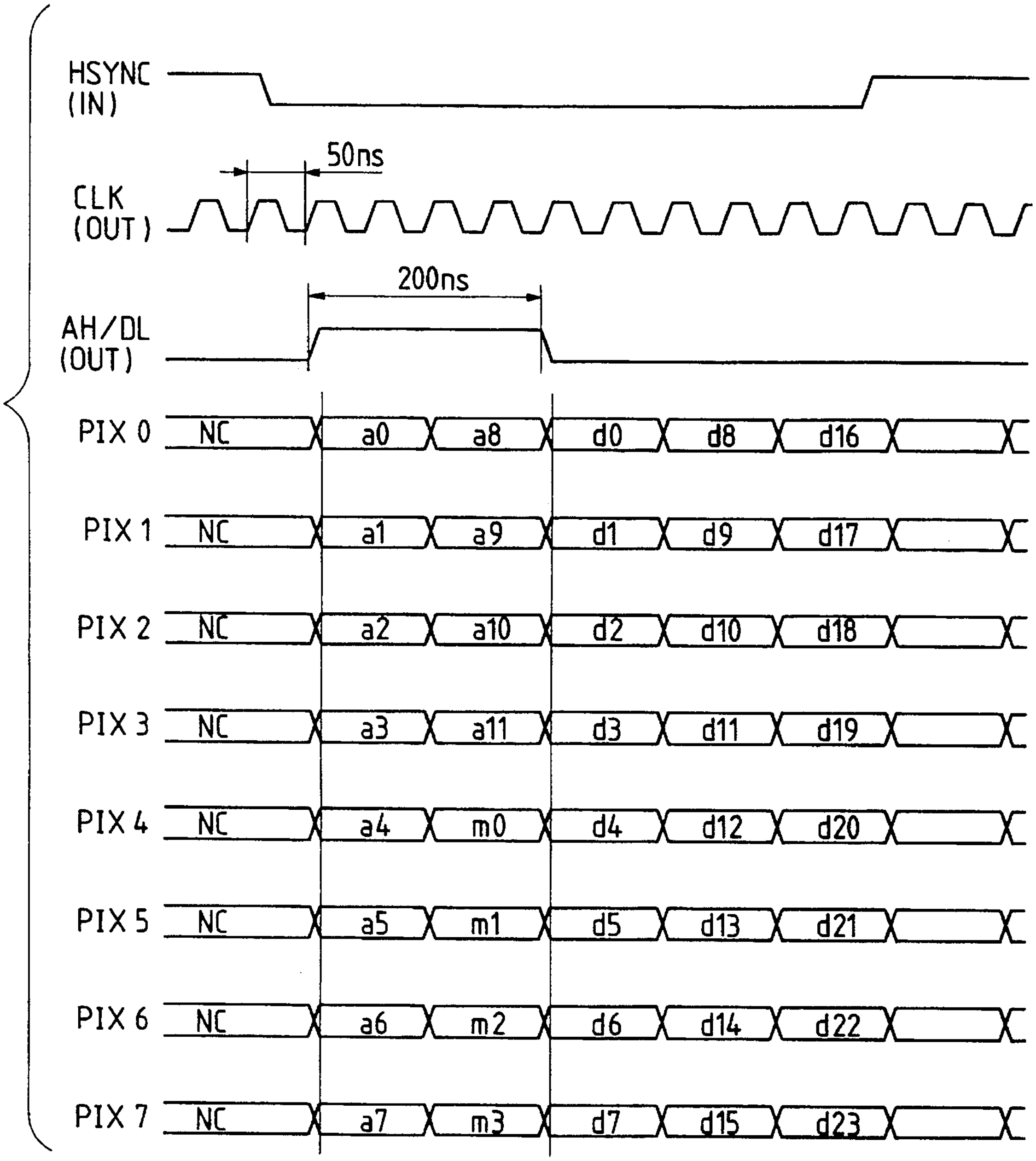
FIG. 5 is a timing chart of signals supplied from the interface of the first embodiment.

FIG. 5 is a timing chart showing an example of data and other signals sent from the interface 219.

In FIG. 5, CLK represents a transfer clock, and AH/DL represents a command/image data discrimination signal. When this signal takes a high level, data of PIX0 to PIX7 are for scan line information (a0 to a11) and command data (m0 to m3), and when it takes a low level, data of PIX0 to PIX7 are for display data.

PIX0 to PIX7 are signals supplied from the interface 219 to FLCD 201 via eight parallel lines.

HSYNC represents a horizontal synchronizing signal supplied from CRTC 213 to FLCD 201 via the interface 219. Under the control of CRTC 213, the address controller 218 accesses VRAM 212 and supplies to the interface 219 the information representing to which scan line of FLCD the access was made.

The display data read from VRAM 212 is supplied to the interface 219 which in turn adds the scan line information to the display data and sends it to FLCD 201. The scan line rewrite time and interlacing mode are controlled by CRTC 213. If the temperature dependency of the scan line rewrite time is present on the side of the FLCD unit 202 and the rewrite time and interlacing mode are required to be controlled in accordance with the temperature, the temperature sensor 203 measures one of the temperature of the FLCD unit 202 and the internal atmosphere temperature of FLCD 201, or both of them. The temperature data is A/D converted by the A/D converter 211. In accordance with the digital value of the temperature data or the control or timing signal generated by the timing controller 216 from the temperature information, CRTC 213 controls the rewrite time and interlacing mode.

The above operations are for the case where the data in VRAM 212 is fixed, i.e., the content of VRAM 212 was not rewritten. Next, the operations when the content of VRAM 212 was rewritten will be described with reference to FIG. 7.

First, at Step 701, an ordinary interlacing display is performed. At Step 702, it is checked if a partial rewrite was executed in VRAM. This rewrite in VRAM is executed by CPU 101 or other devices connected to the system bus 119. Part or all of the content of VRAM 212 is rewritten in accordance with addresses, data, and control signals supplied from the system bus 119. By monitoring these signals, the partial rewrite detector 214 can detect the partial rewrite area of VRAM 212 and identify the scan lines of the display screen of the FLCD unit 202. Instead of monitoring the signals supplied to the FLCD interface 210 via the system bus 119, the partial rewrite detector 214 may directly monitor the signals supplied to VRAM 212. This case is useful when VRAM is rewritten not only from the system but also from CRTC 213.

The above operations are performed by hardware. Software may be used for performing such operations as in the following.

For example, a device driver providing a display function is used to supply the partial rewrite address of VRAM 212 to the partial writing detector 214. In this case, the hardware of the partial writing detector 214 can be simplified considerably. After detecting the partial rewrite scan line on the display screen of the FLCD unit 202, the partial writing detector 214 sets the corresponding rewrite flag register 302 of the rewrite flag register group 301 at Steps 703 and 704. The internal logical structure of the rewrite flag register group 301 is as shown in FIG. 3. Assuming that the number of scan lines is 1024, the number of rewrite flag registers 302 is 1024, the number of rewrite flag registers 303 is 512, the number of rewrite flag registers 304 is 256, and the number of rewrite flag registers 305 is 128.

In the case of an FLCD 201 for the color or monochrome halftone display, one pixel of the FLCD unit 202 has a plurality of bits. If these bits are independently controlled for the partial rewrite, the number of registers of the rewrite flag register group 303 increases correspondingly. Naming the rewrite flag register 302 a lower register and naming the rewrite flag register 305 an upper register, if the lower register is set by the partial writing detector 214, the upper register is unconditionally affected by the flag change of the lower register.

Figure 6:
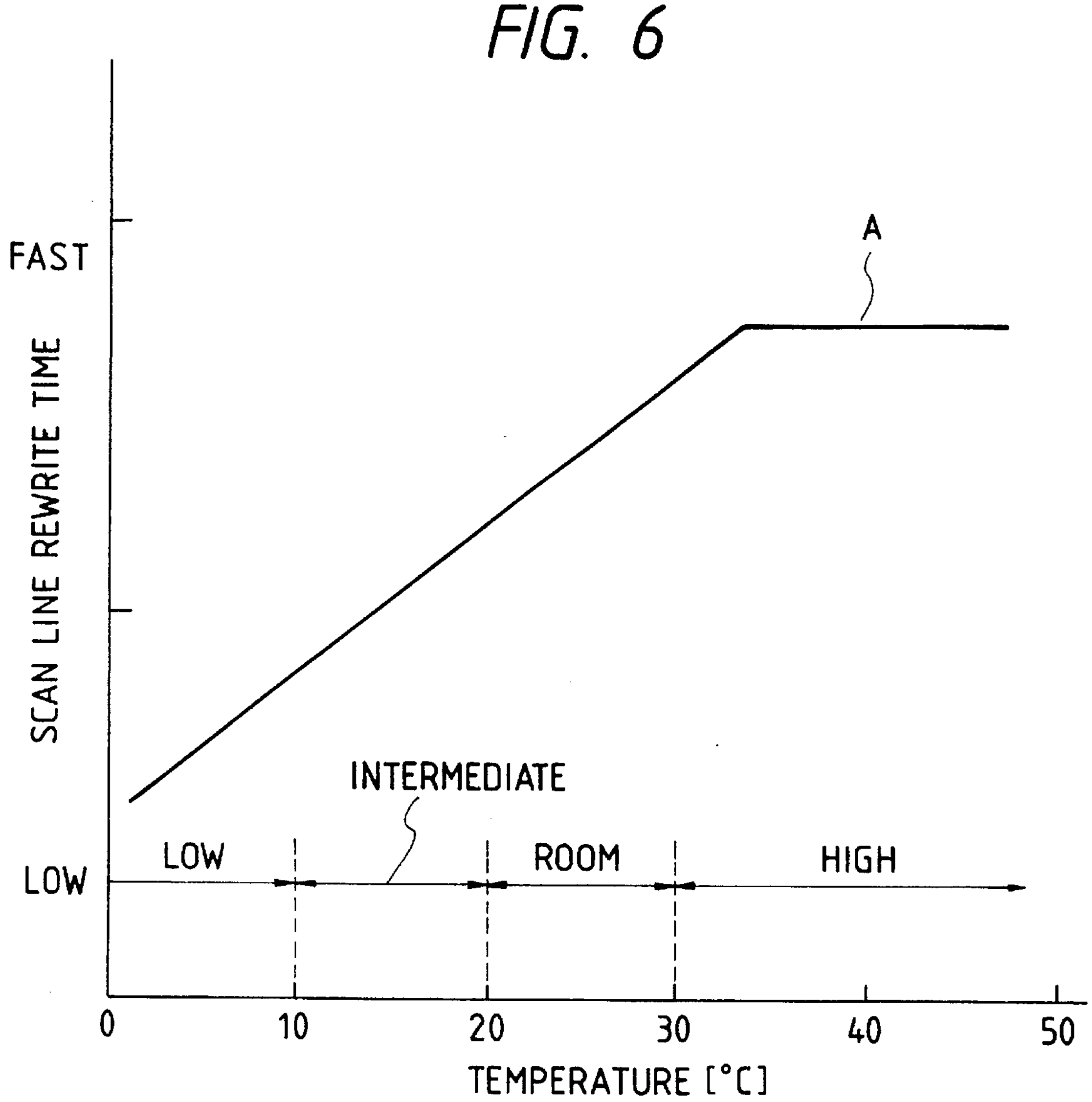
FIG. 6 is a diagram showing the relationship between temperature and FLCD rewrite time.

The selector 215 selects one of the outputs from the rewrite flag registers 302 to 305 in accordance with the digital temperature information from the A/D converter 211, and supplies it as the rewrite information to the partial rewrite controller 217. Assuming that the relationship between the temperature of the FLCD unit 202 and the scan line rewrite time is given by a line A in FIG. 6, the selection of one of the outputs from the rewrite flag register group 301 is determined from this temperature curve A.

Specifically, the scan line rewrite time becomes long within the low temperature range, and so the outputs of the rewrite flag registers 302 are selected by the selector 215. Therefore, only the scan lines of the FLCD unit 202 where the content of VRAM 212 was changed are rewritten.

The scan line rewrite time becomes short within the high temperature range, and so the outputs of the rewrite flag registers 305 are selected by the selector 215. The rewrite flag register 305 has redundancy four times as great as that of the rewrite flag register 302. Scan lines are rewritten in accordance with the flag information of the rewrite flag registers 305. Namely, four scan lines per one ON-flag are rewritten.

The rewrite control is executed by the partial rewrite controller 217. When the scan line rewrite is determined necessary from the flag information of the rewrite flag register group 301, the interlacing display by CRTC 213 is intercepted and the partial rewrite controller 217 accesses VRAM 212. The accesses to VRAM 212 by CRTC 213 and the partial rewrite controller 217 are arbitrated by the control of the partial rewrite controller 217 by the address controller 218.

The address controller 218 generates the rewrite scan line information for the FLCD unit 202, basing upon the signals supplied from CRTC 213 or the partial rewrite controller 217, and supplies it to the interface 219. The interface 219 sends to FLCD 201 the scan line information supplied from the address controller 218 and the display data read from VRAM 212. At Step 705, the status of CRTC 213 is checked. At Step 706, the partial rewrite controller 217 rewrites one scan line basing upon the ON information of a flag of the rewrite flag register group 301. At Step 707, each time one scan line is rewritten, the corresponding flag is cleared. The upper flag is affected unconditionally at Step 708 in the same manner when a flag is turned on. The flags of the lower flag registers affected by the cleared flag are all cleared.

Figure 7:
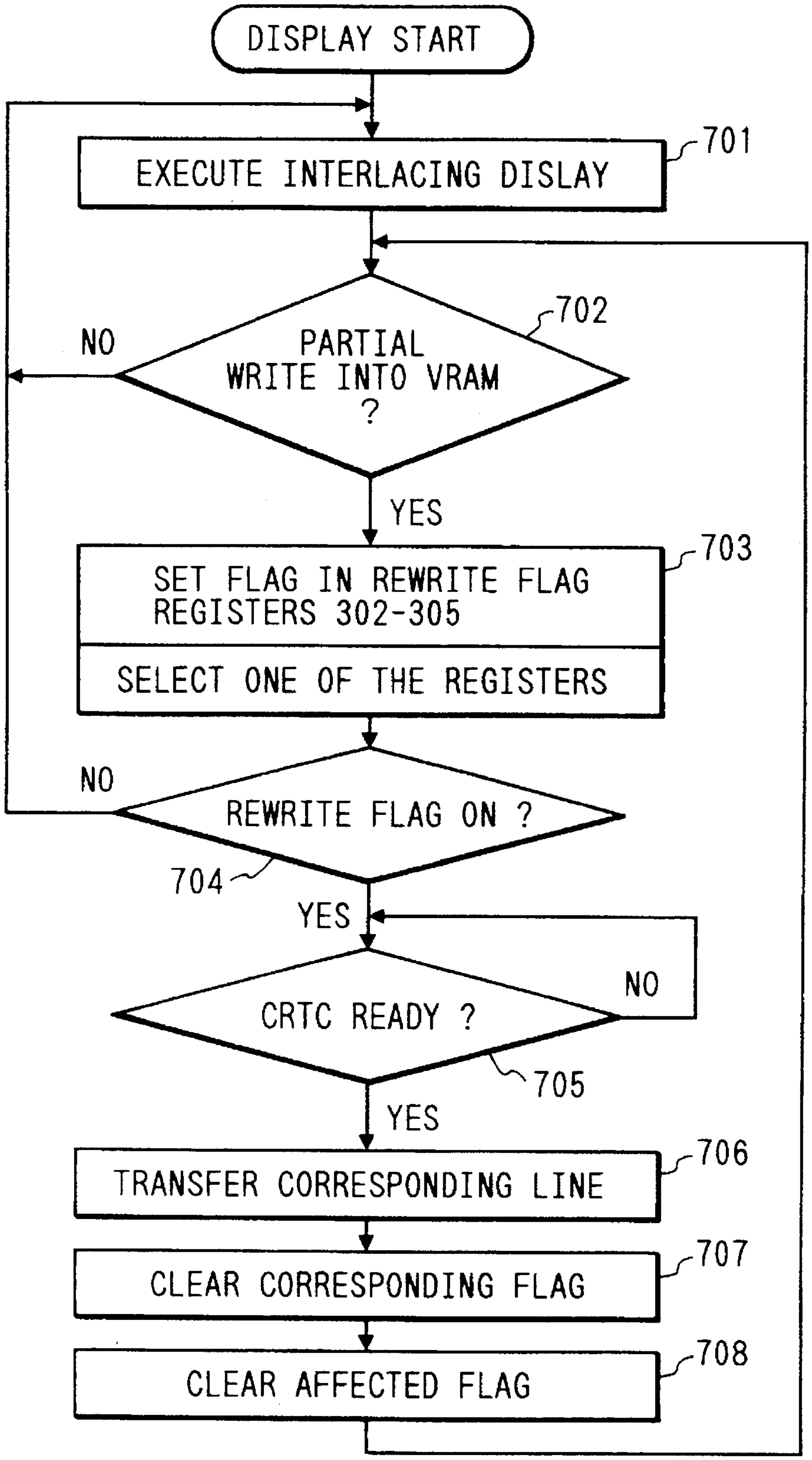
FIG. 7 is a flow chart illustrating the operation of the first embodiment.

Next, the operations when a temperature changes will be described with reference to FIG. 8. At Steps 701 to 708 shown in FIG. 8, the operations similar to those described with FIG. 7 are executed.

Figure 8:
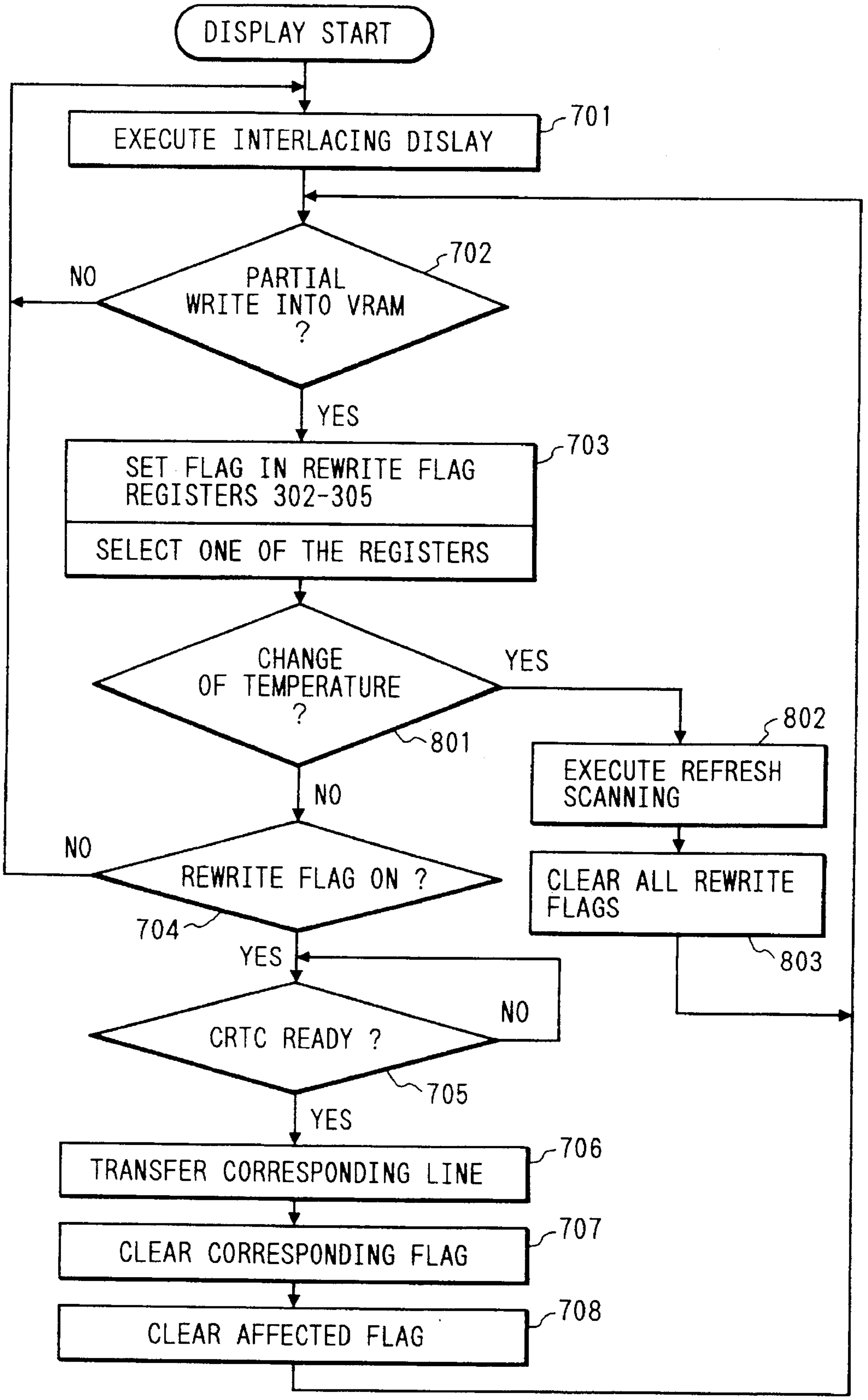
FIG. 8 is a flow chart illustrating another operation of the first embodiment.

The flow chart of FIG. 8 illustrates the operations when there is a temperature change requiring to change the rewrite flag register group 301 while executing the partial rewrite. At Step 801, it is checked whether the temperature has changed and there is a change in the temperature range shown in FIG. 6. If there is a change in the temperature range, at Steps 802 and 803, the refresh operation is executed and thereafter the partial rewrite controller 217 clears all the contents of the flag register group 301. Thereafter, the operations similar to those described with FIG. 7 are performed.

According to this embodiment, the refresh scanning is performed prior to detecting the partial rewrite, enabling to suppress the influence of the display speed caused by the temperature change.

Next, an example of the refresh operation will be described with reference to FIG. 10.

The following description is for the case where the present invention is applied not to the partial rewrite of the display screen when the rewrite occurs in VRAM 212 but to the normal refresh when the rewrite does not Occur in VRAM 212.

Figure 9:
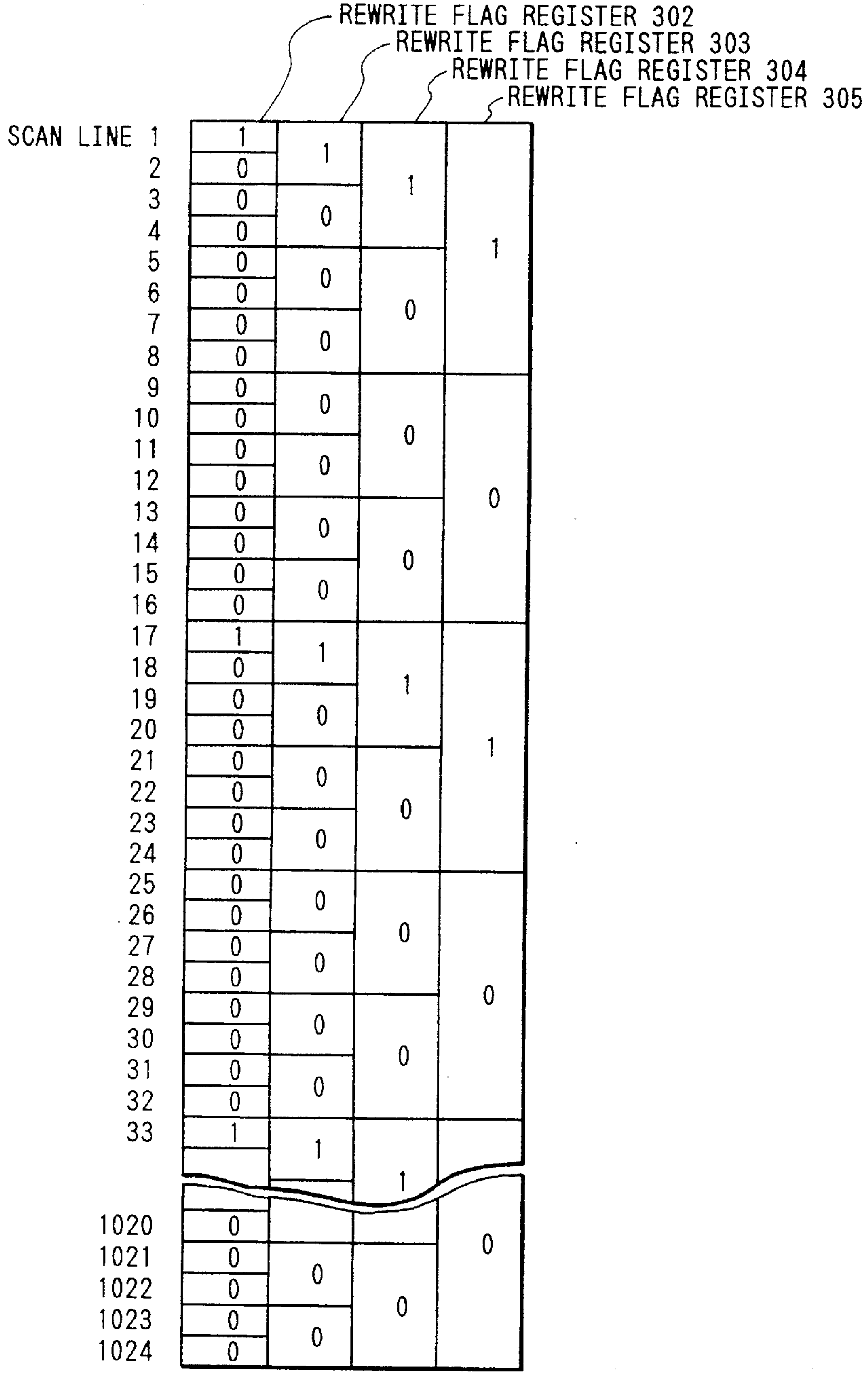
FIG. 9 is a conceptual diagram showing an example of the rewrite flag register group during the refresh operation of the first embodiment.

It is assumed that the internal logic of the rewrite flag register group 301 is as shown in FIG. 3 and that the interlacing display for the refresh operation is executed every sixteenth lines, i.e., one frame is completed by sixteen fields. Assuming that the rewrite flag registers 302 are turned on every sixteenth lines, at the first, seventeenth, thirty third, . . . lines, the status of all rewrite flag registers become as shown in FIG. 9. It is further assumed that the upper flag registers 304 at the high temperature are selected for the refresh operation. In this case, the lines 1 to 4 are scanned first because the corresponding flag is on, the lines 17 to 20 are scanned second because the corresponding flag is on, . . . , and lastly the lines 1009 to 1012 are scanned to complete one field. The flags at the scanned line are cleared. Similarly, the scan lines 5 to 8, lines 21 to 24, . . . , are sequentially scanned. After scanning the four fields, the refresh operation of one frame is completed. These operations are repeated to continue the refresh operation.

Figure 10:
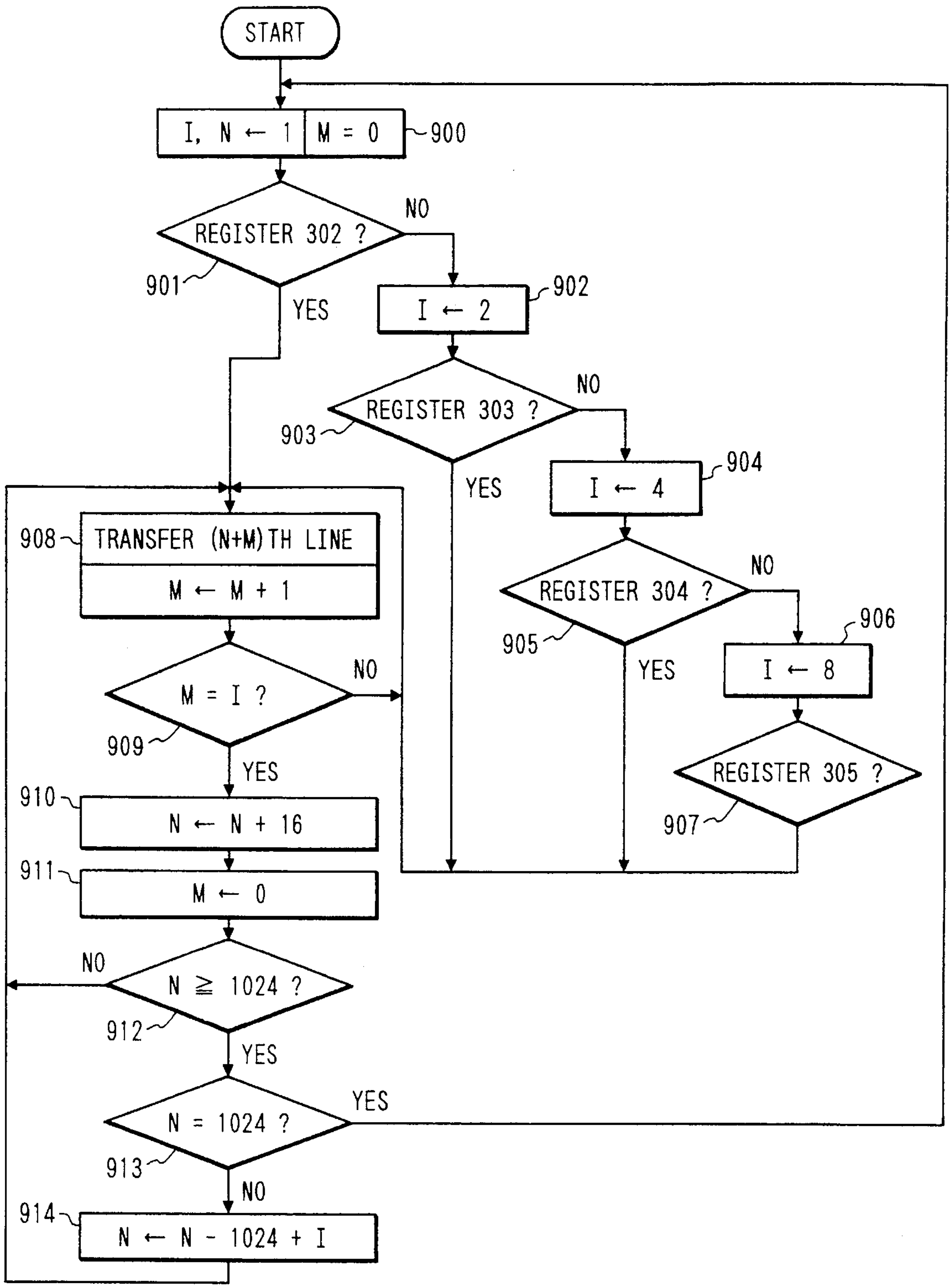
FIG. 10 is a flow chart illustrating the refresh operation of the first embodiment.

In the flow chart shown in FIG. 10, N represents an offset value of scan lines, M represents a value added to N, and I represents the number of scan lines per one flag. At Step 901, I, N and M are initialized. These initial values may be stored in advance in the main memory 104 or ROM 103, or may be entered from the keyboard 109 or the like.

Next, which registers were selected from the rewrite flag register group 301 is checked from the temperature data. At Step 901, it is checked whether the rewrite flag register 302 is selected. If not selected, I is set to "2" at Step 902. Similar operations are repeated at Steps 903 to 907.

In this exemplary case, since the rewrite flag registers 304 were selected, I is set to "4" and the control advances from Step 905 to Step 908. At Step 908, the (N+M)-th line data is transferred and M is set to M+1. At Step 909, it is checked whether M=I. Namely, at Steps 908 and 909, data of four lines is sequentially transferred starting from the upper line.

At Step 910, N is set to N+16 because of the interlacing display is carried out every 16-th lines. At Step 911, M is set to "0" because the data transfer is performed starting from the uppermost line of the four lines. At Step 912, it is checked whether N>1024, i.e., whether N is the last scan line of one frame or larger. If smaller, the control returns to Step 908. If larger, it is checked at Step 913 whether N is equal to 1024. If equal, the control returns to Step 901. If not equal, N is set to N−1024+I to return to Step 908.

As described above, the present invention is applicable also to the ordinary refresh operation.

The logical structure of the rewrite flag register group 301 shown in FIG. 3 is configured as in the following.

1. The lowest registers (rewrite flag registers 302) correspond to scan lines of the display screen.

2. The number of rewrite flag register sets is 4.

3. The operation at the upper register is a two-input OR logical operation.

Figure 11:
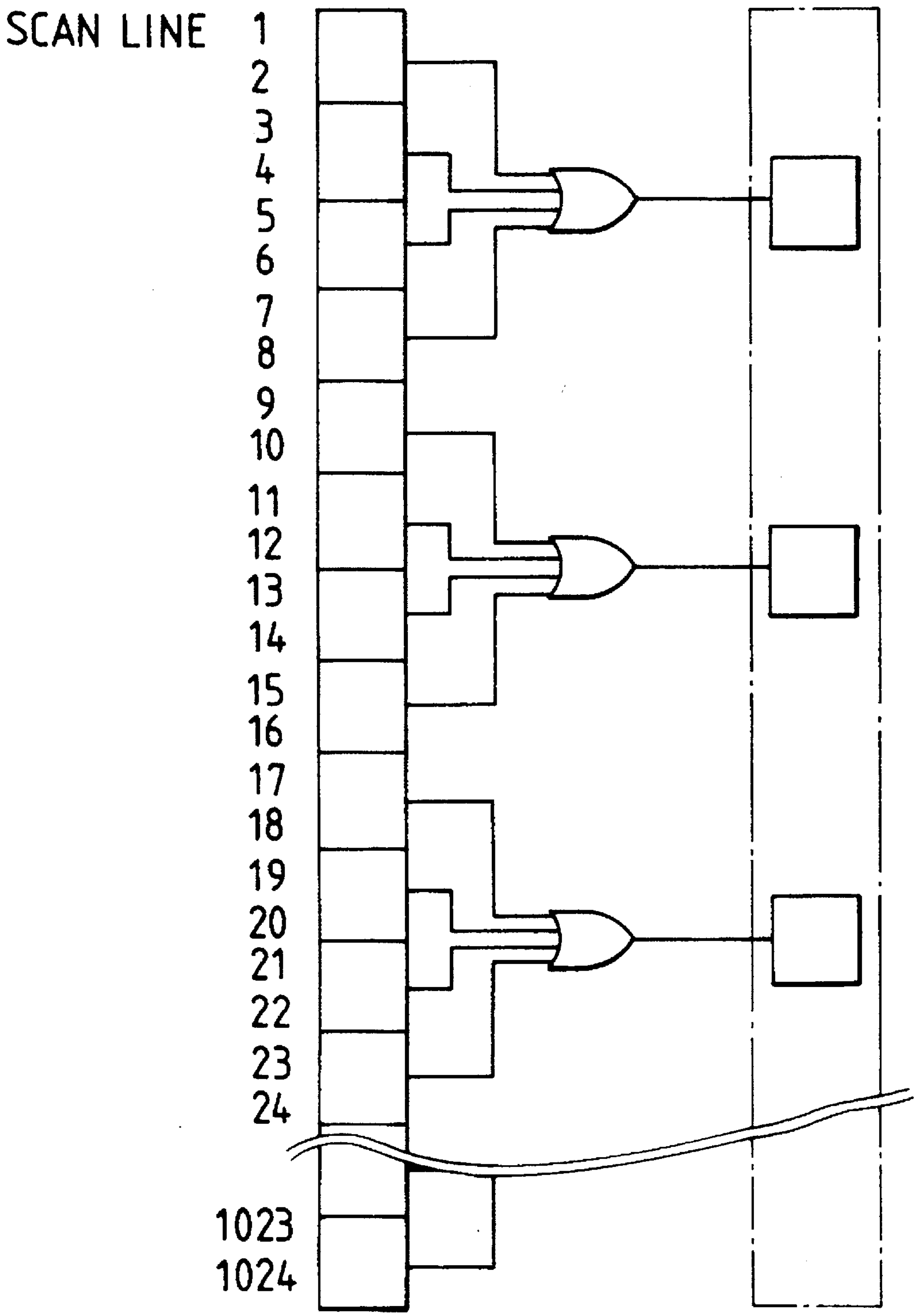
FIG. 11 is a conceptual diagram showing another example of the rewrite flag register group of the first embodiment.

This configuration is one example, and obviously it is optimized in accordance with the temperature characteristic of the display device, the arrangement of control circuits, and the like. For example, as shown in FIG. 11, the configuration may be determined as in the following.

1. One flag of the lowest register corresponds to two scan lines of the display screen.

2. The number of rewrite flag register sets is 2.

3. The operation at the upper register is a four-input OR logical operation.

With this configuration, the number of registers can be reduced, simplifying the structure of circuits including the controller for switching between the upper and lower registers.

According to the embodiments described above, an optimum access of the display device is possible by providing a plurality of rewrite flag registers corresponding to scan lines of the display screen and switching between the registers in accordance with a change in the environmental condition such as a temperature.

(2nd Embodiment)

Figure 12:
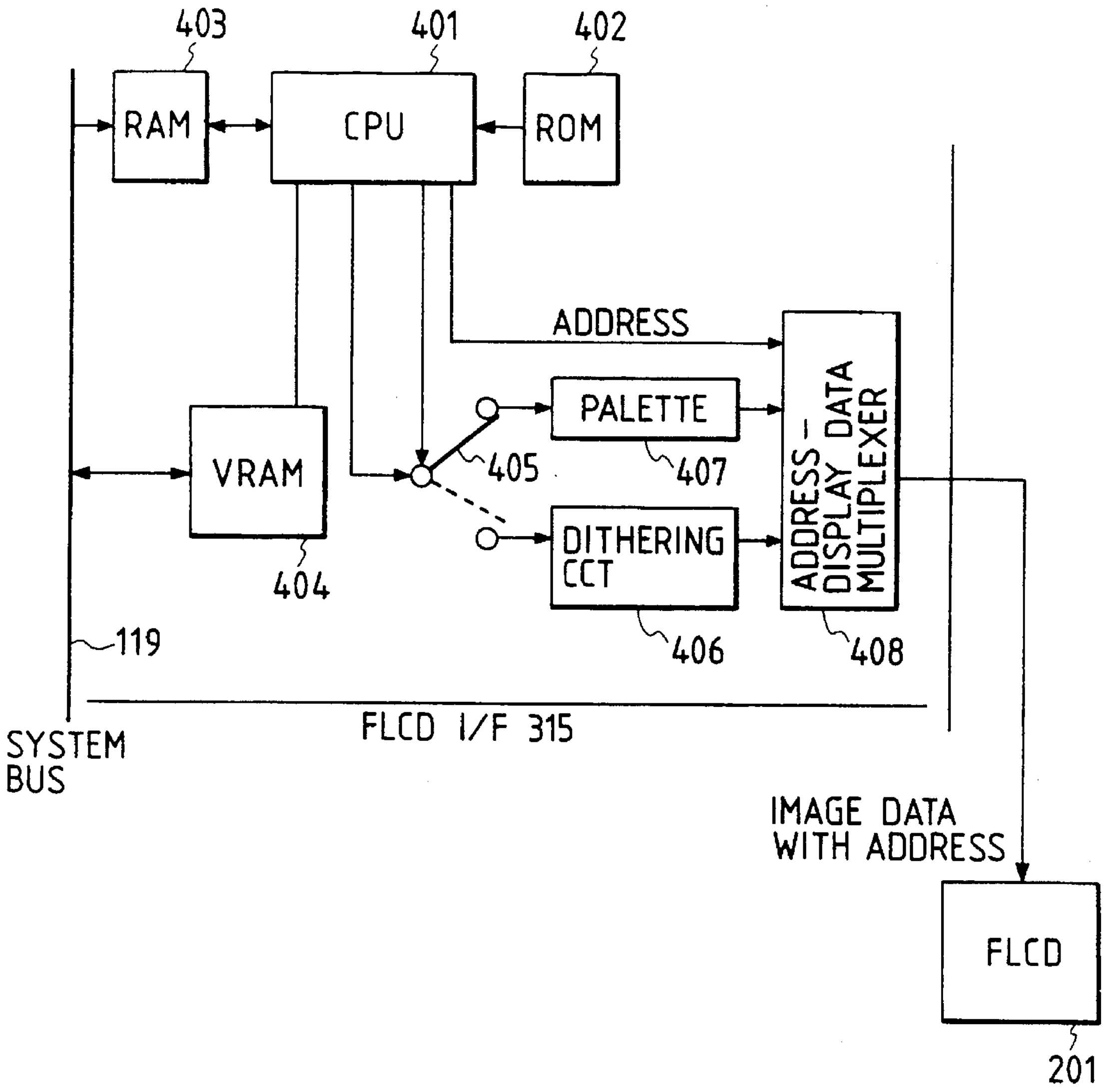
FIG. 12 is a block diagram showing the detail of the FLCD interface according to the second embodiment.

FIG. 12 is a block diagram showing the detail of an FLCD interface according to another embodiment.

Figure 13:
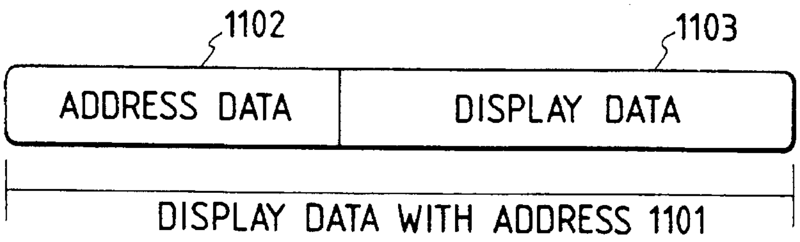
FIG. 13 shows the data format of display data with address to be used by FLCD.

In FIG. 12, reference numeral 401 represents a CPU for controlling the entirety of the FLCD interface. Reference numeral 402 represents a ROM for storing programs to be executed by CPU 401 and its reference data. Reference numeral 403 represents a RAM to be used by CPU 401 as the working area. RAM 403 is accessible by the main CPU 101 via the system bus 119. Reference numeral 404 represents a VRAM accessible by the main CPU 101 and CPU 401. Reference numeral 405 represents a dither ON/OFF switch to be turned on or off by CPU 401. This switch determines whether the display data from VRAM 404 to FLCD 201 via CPU 401 is to be subjected to the dither process. Reference numeral 406 represents a dither operation circuit which performs the dither process for the display data transferred from CPU 401 and outputs the binarized display data to an address/display multiplexer 408. Reference numeral 407 represents a color palette which converts the display data transferred from CPU 401 into color data capable of being displayed on FLCD 201 and outputs the color data to the address/display data multiplexer 408. The multiplexer 408 multiplexes the display data of one line of FLCD and the address data and outputs the display data with an address to FLCD. FIG. 13 shows the format of image data with an address. Reference numeral 1102 represents address data indicating the order of a lateral scan line of FLCD. Reference numeral 1103 represents display data of one line of FLCD. Reference numeral 210 shown in FIG. 12 represents FLCD on which the display data transferred from the FLCD interface is displayed at the transferred address.

The display data output operation of the FLCD interface shown in FIG. 12 will be described. The main CPU 101 writes display data in the form of bit map in VRAM 404. In this case, the main CPU 101 may write data representing whether the display data is character data or image data, in RAM 403 in the form of a table. CPU 401 determines which data in VRAM 404 is transferred to FLCD 201. The data is then transferred to the palette 407 or dither operation circuit 406. The transferred data corresponds to one lateral scan line of FLCD 201. If the display data of VRAM 404 is image data such as a natural image, the dither process is selected. If the display data of VRAM 404 is character data, the palette process is selected. Whether the data is the image data or character data is determined by CPU 401 while referring to the table in RAM 403. The display data is processed by the palette 407 or dither operation circuit 406 and transferred to the address/display data multiplexer. CPU 401 transfers the address of the display data on FLCD 201 to the address-display data multiplexer 408. The multiplexer 408 multiplexes the display data of one line of FLCD 201 and its address data and outputs the display data with the address to FLCD 201. FLCD 201 displays the display data of one line transferred from the FLCD interface at the transferred address.

Figure 14:
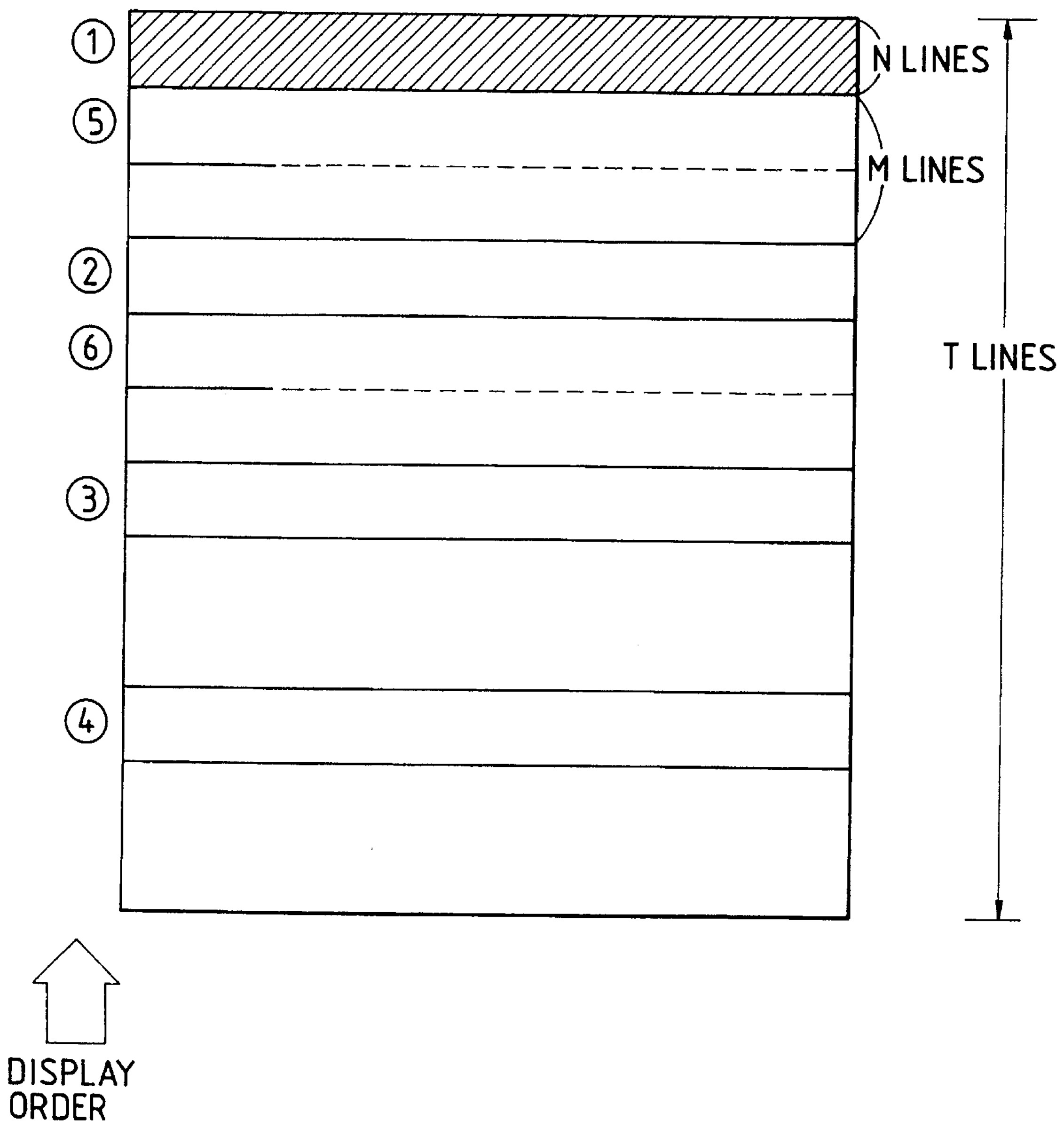
FIG. 14 is a schematic diagram of the FLCD display screen where the interlacing display by a plurality set of N lines interlaced every M-th lines is executed.
Figure 15:
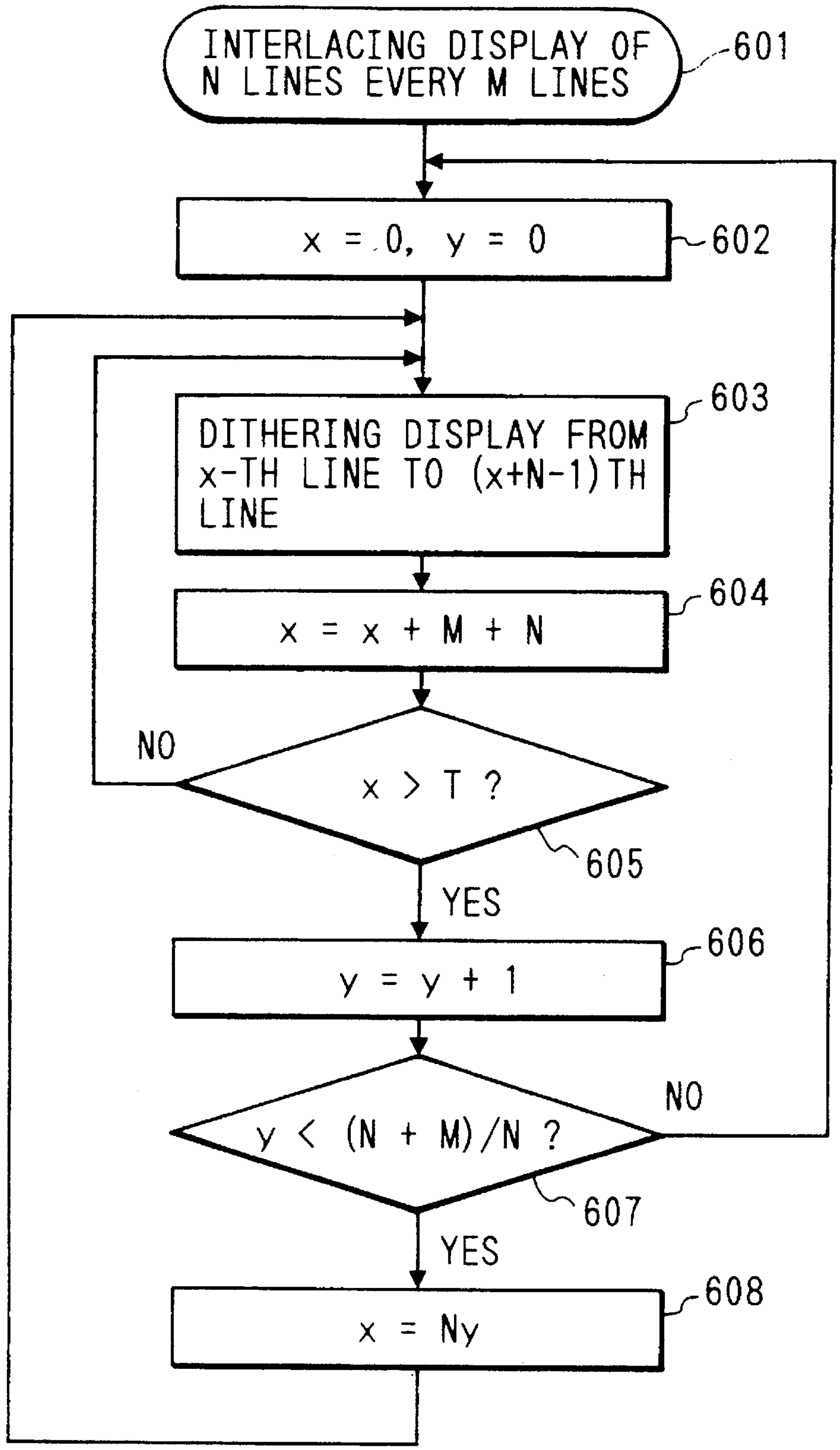
FIG. 15 is a flow chart illustrating the operation of the FLCD interface where the interlacing display by a plurality set of interlacing lines is executed.

With reference to FIGS. 14 and 15, the operation of the FLCD interface 210 will be described wherein the interlacing display for the whole display screen of FLCD 201 is performed by scanning a plurality set of interlaced lines at each field. In this example, it is assumed that image data is subjected to the dither process and displayed on the whole display screen.

FIG. 14 schematically illustrates the whole display screen of FLCD 201 where the interlacing display is performed by a plurality set of N lines interlaced every M-th lines. In order to speed up and simplify the process, the value N is made equal to the size of the vertical side of the dither matrix. In order to simplify the process, M is set to N multiplied by an integer. T represents the total number of lines of FLCD.

FIG. 15 is a flow chart showing the operation of the FLCD interface 210 for the interlacing display on FLCD 201 by a plurality set of interlaced lines. In this flow chart, x represents a variable indicating the line presently processed, and y represents a variable indicating the present order of scanning. At Step 602, the variables x and y are initialized to "0". The values x and y are incremented at the following Steps. At Step 603, N lines from the x-th line are subjected to the dither process and displayed. At Step 604, the value x is incremented for the interlacing display. It is checked at Step 605 whether the variable x indicates the last line. At Step 607 it is checked whether one field has been displayed on the whole display screen 607. If displayed, the control returns to Step 602 to display again from line 0. If not, the variable x is set to Ny. In the above manner, the interlacing display by a plurality set of interlacing lines shown in FIG. 14 is performed.

Next, the interlacing display of mixed data of character and image data by a plurality set of interlacing lines will be described.

Figure 16:
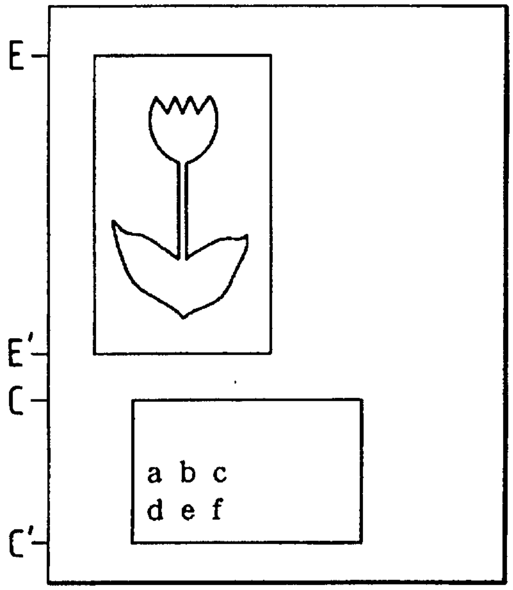
FIG. 16 is a schematic diagram showing the FLCD display screen for mixed display data of image and character data.
Figure 16:
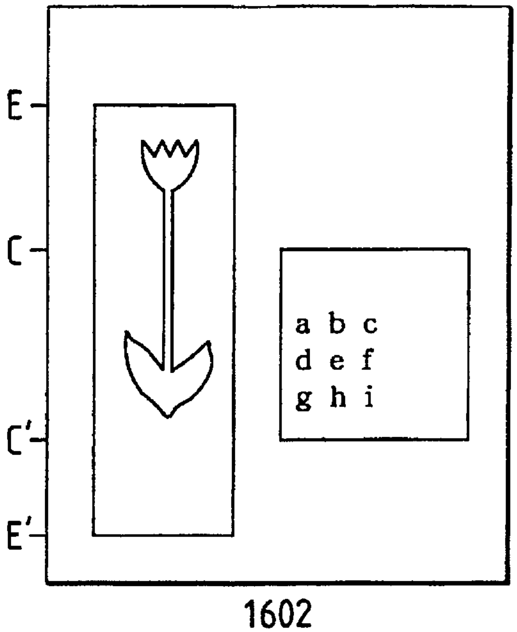
Figure 16:
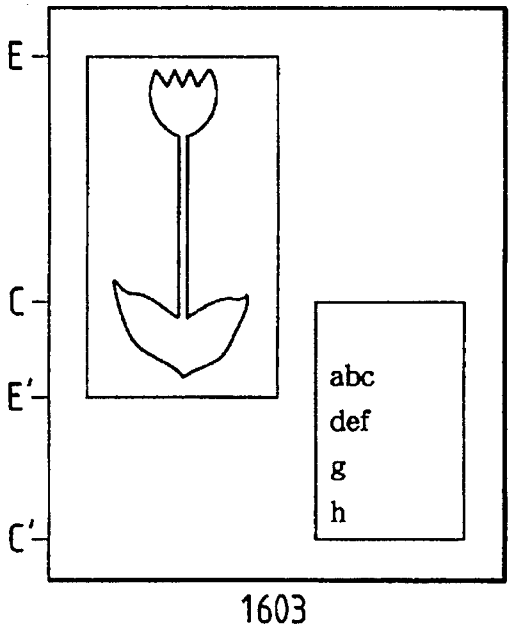
Figure 16:
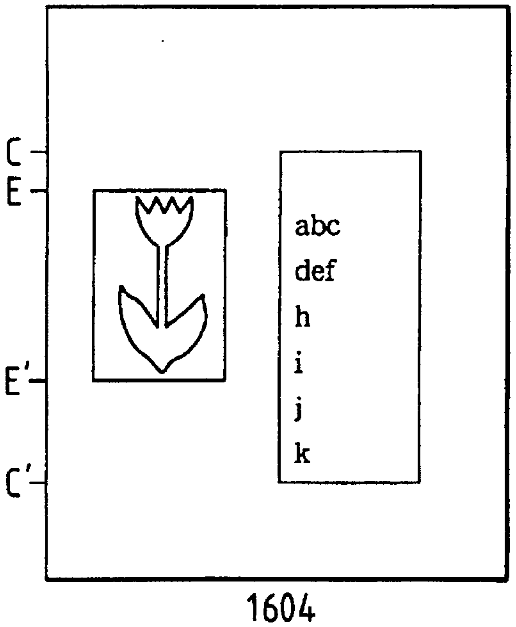

FIG. 16 shows four examples of the relative positions of mixed display data of character and image data. The image data area is from line E to line E', and the character data area is from line C to line C'. Whether the display data is image data or character data is determined by referring to the table written in RAM 403 by the main CPU 101.

For the image data area, the number of a set of interlacing lines is made equal to the size of the vertical side of the dither matrix, simplifying and speeding up the process. For the character data area, the number of a set of interlacing lines is made equal to the number of lines in the vertical direction of a character box, improving the display quality of characters.

In this embodiment, the image data area is subjected to a 4×4 dither process. In the image area therefore, the interlacing display by a plurality set of four lines interlaced every eighth lines is executed. The number of lines in the vertical direction of a character box is assumed to be six. In the character area therefore, the interlacing display by a plurality set of six lines interlaced every twelfth lines is executed. For a line of mixed character and image data, the interlacing display by plurality sets of six lines is performed to preferentially improve the character quality.

In the example indicated by 1601 in FIG. 16, the interlacing display by a plurality set of four interlacing lines is performed from line E to line E', and the interlacing display by a plurality set of six interlacing lines is performed from line C to C'. In the example indicated by 1602 in FIG. 16, the interlacing display by a plurality set of four interlacing lines is performed from line E to line C, the interlacing display by a plurality set of six interlacing lines is performed from line C to C', and the interlacing display by a plurality set of four interlacing lines is performed from line C' to line E'.

In the example indicated by 1603 in FIG. 16, the interlacing display by a plurality set of four interlacing lines is performed from line E to line C, and the interlacing display by a plurality set of six interlacing lines is performed from line C to C'. In the example indicated by 1604 in FIG. 16, the interlacing display by a plurality set of six interlacing lines is performed from line C to C'.

Figure 17:
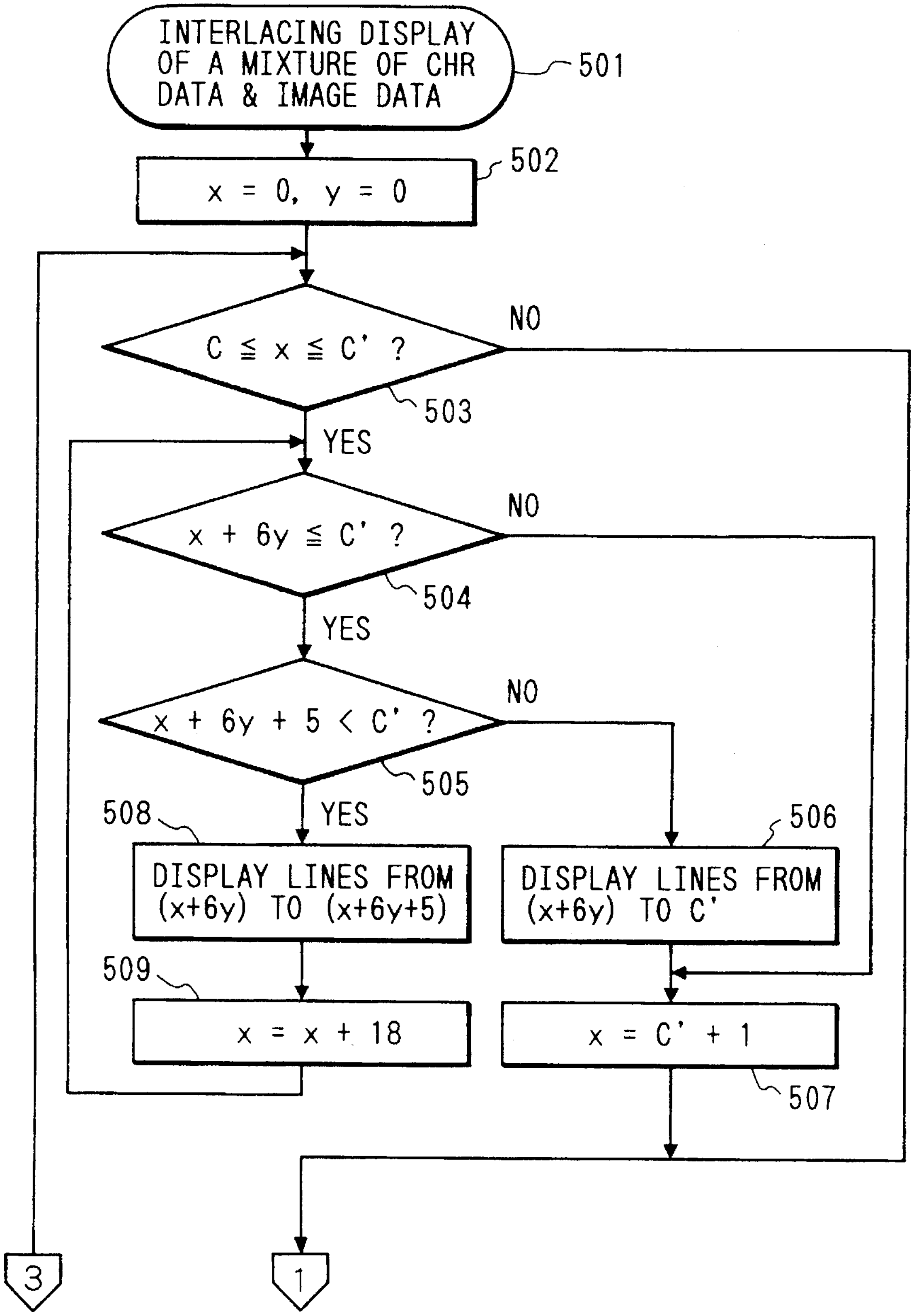
FIG. 17 is a flow chart illustrating the operation of the FLCD interface where the interlacing display on FLCD is executed by a plurality set of interlacing lines for the mixed display data of image and character data such as shown in FIG. 16.
Figure 18:
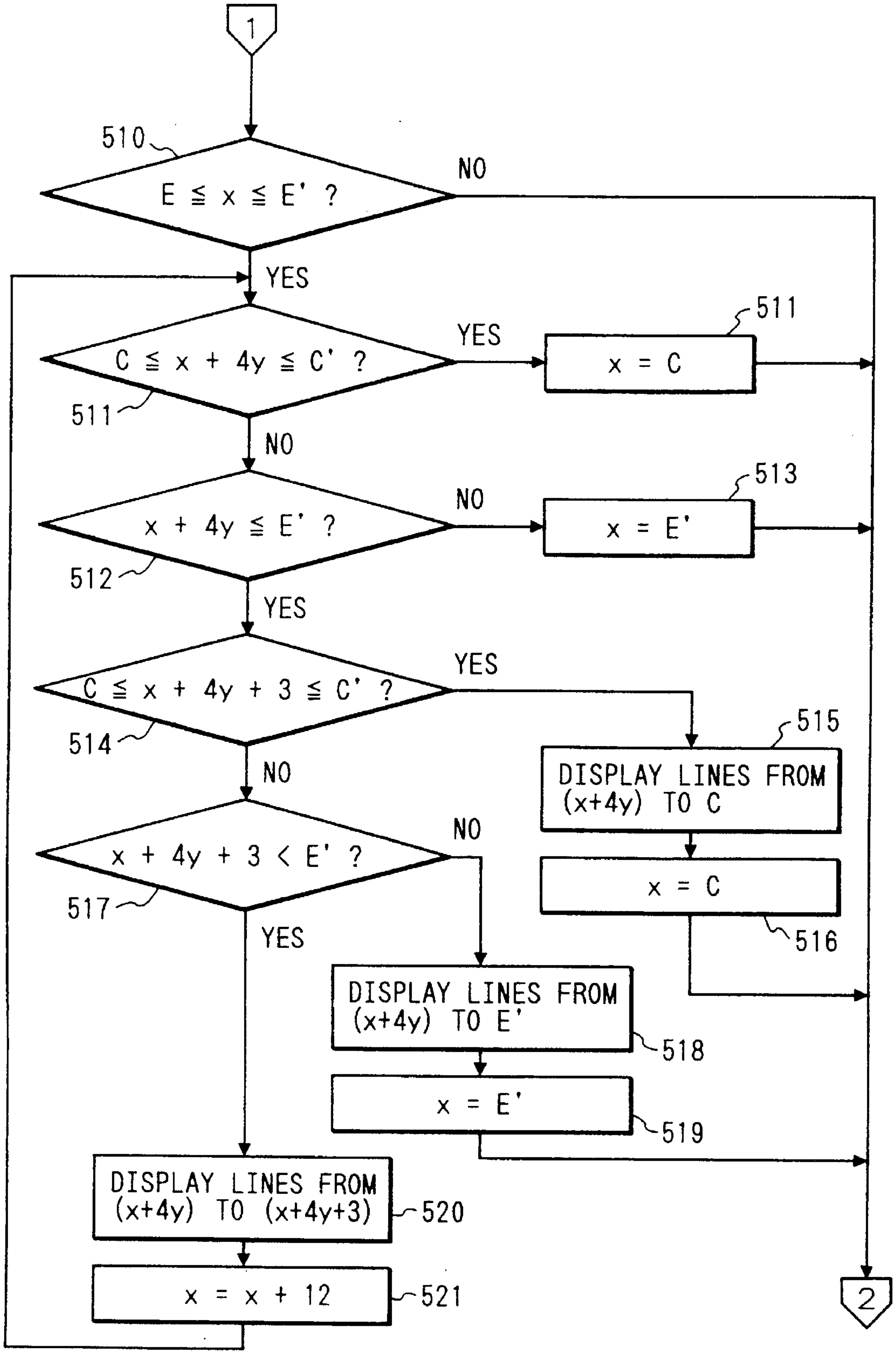
FIG. 18 is a flow chart illustrating the operation of the FLCD interface where the interlacing display on FLCD is executed by a plurality set of interlacing lines for the mixed display data of image and character data such as shown in FIG. 16.
Figure 19:
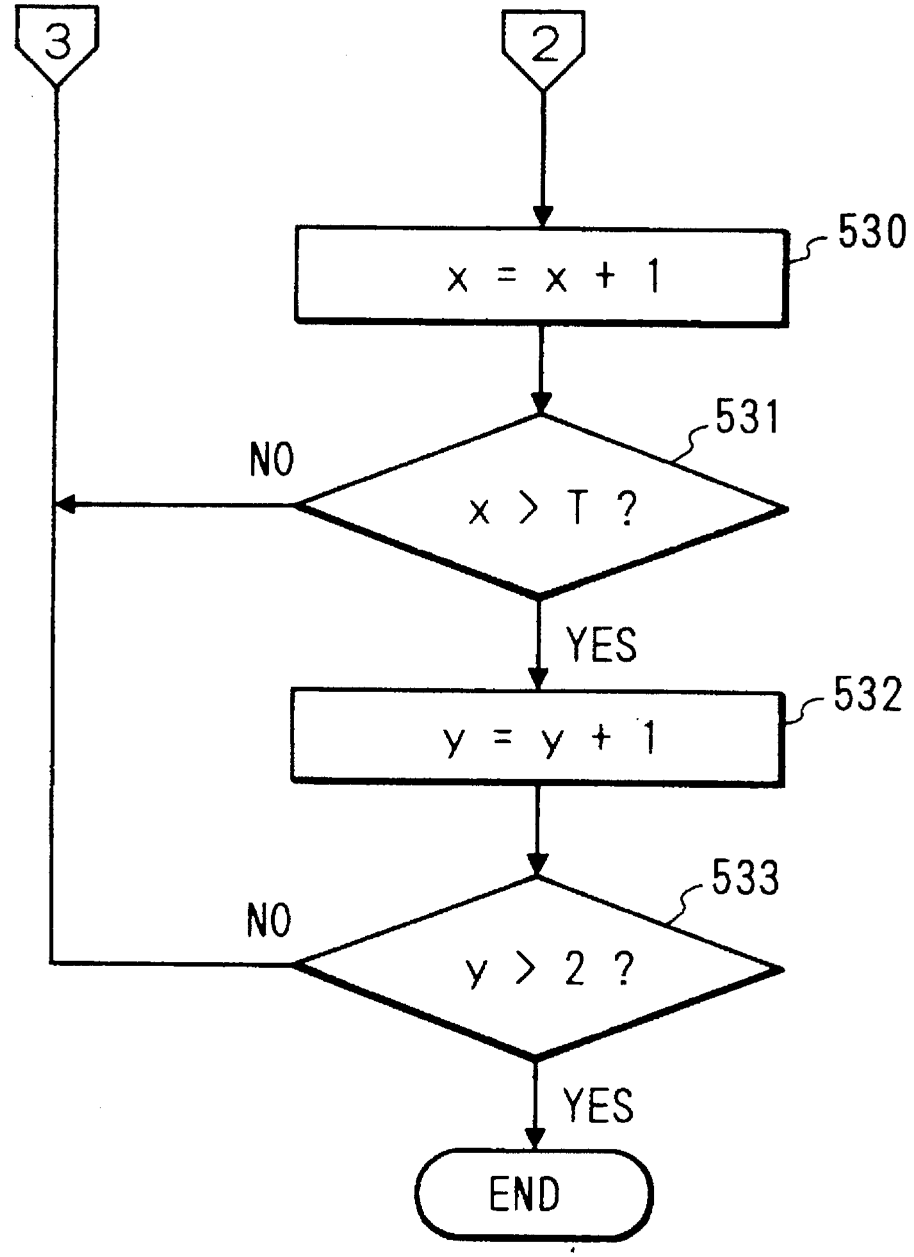
FIG. 19 is a flow chart illustrating the operation of the FLCD interface where the interlacing display on FLCD is executed by a plurality set of interlacing lines for the mixed display data of image and character data such as shown in FIG. 16.

FIGS. 17 to 19 are flow charts illustrating the operation of the FLCD interface 210 for the interlacing display of the mixed character and image data such as shown in FIG. 16 on FLCD 201 by a plurality set of interlacing lines.

In these flow charts, x represents a variable indicating the line presently processed, and y represents a variable indicating the present order of scanning. At Step 502 shown in FIG. 17, the variables x and y are initialized to "0". The values x and y are incremented at the following Steps.

At Step 503, it is checked whether the display area is the character data area. This judgement Step 503 is executed before a judgement Step 510 in order to give the priority of the image data display over the character data display. Steps 503 to 509 are processed for the character data area. In the character data area, the interlacing display by a plurality set of six lines interlaced every twelfth lines is performed.

At Step 510 shown in FIG. 18, it is checked whether the display area is the image data area. Steps 510 to 521 are processed for the image data area. In the image data area, the interlacing display by a plurality set of four lines interlaced every eighth lines is performed.

At Step 530 shown in FIG. 19, the variable x is incremented by "1". Steps 531 to 533 are processes to be executed when the line presently processed reaches the last line.

With the above processes, the interlacing display by a plurality set of interlacing lines is performed for the mixed character and image data such as shown in FIG. 16.

The processes illustrated in the flow charts of FIGS. 17 to 19 may be easily applied to the case where a plurality of image and character data areas are present.

Figure 20:
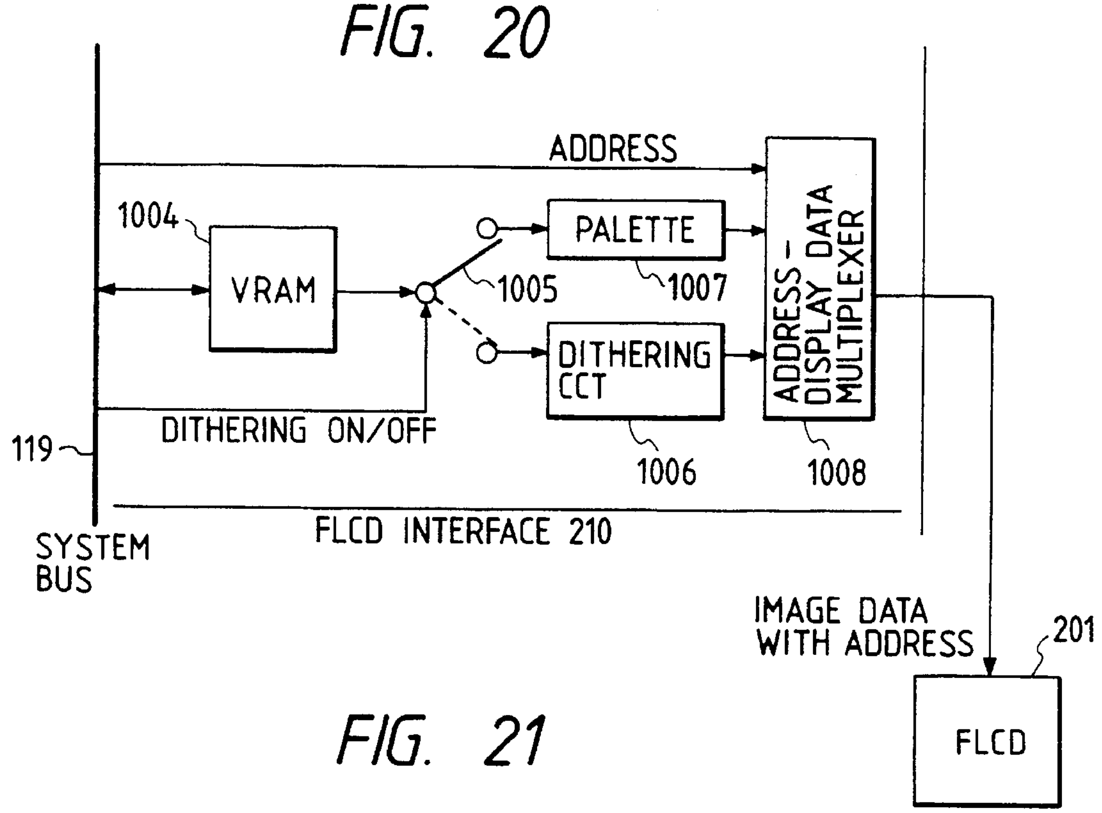
FIG. 20 is a block diagram showing another structure of the FLCD interface of the second embodiment.

Another example of the structure of the FLCD interface 210 of this embodiment is shown in FIG. 20.

In this example, the processes to be executed by CPU 401 of the FLCD interface shown in FIG. 12 are executed by the main CPU 101. The flow charts for the FLCD interface 210 shown in FIG. 20 are the same as those shown in FIGS. 15 and 17 to 19.

FIG. 20 is a block diagram showing another example of the structure of the FLCD interface 210 of this embodiment.

In FIG. 20, reference numeral 1004 represents a VRAM, which is accessible by the main CPU 101. Reference numeral 1005 represents a dither ON/OFF switch to be turned on or off by the main CPU 101. This switch determines whether the display data from VRAM 1004 to FLCD 201 is to be subjected to the dither process. Reference numeral 1006 represents a dither operation circuit which performs the dither process for the display data transferred from VRAM 1004 and outputs the binarized display data to an address/display multiplexer 1008. Reference numeral 1007 represents a color palette which converts the display data transferred from VRAM 1004 into color data capable of being displayed on FLCD 201 and outputs the color data to the address/display data multiplexer 1008. The multiplexer 1008 multiplexes the display data of one line of FLCD 201 and the address data and outputs the display data with an address to FLCD 201. The display data with an address of one line transferred from the FLCD interface 210 is displayed at the designated address.

The display data output operation of the FLCD interface shown in FIG. 20 will be described. The main CPU 101 writes display data in the form of bit map in VRAM 1004. CPU 401 determines which data in VRAM 1004 is transferred to FLCD 201. The data is then transferred to the palette 1007 or dither operation circuit 1006. The transferred data corresponds to one lateral scan line of FLCD 201. If the display data of VRAM 1004 is image data such as a natural image, the dither process is selected. If the display data of VRAM 1004 is character data, the palette process is selected. The display data is processed by the palette 1007 or dither operation circuit 1006 and transferred to an address/display data multiplexer 1008. The main CPU 101 transfers the address of the display data on FLCD 201 to the address/display data multiplexer 1008. The multiplexer 1008 multiplexes the display data of one line of FLCD 201 and its address data and outputs the display data with the address to FLCD 201. FLCD 201 displays the display data of one line transferred from the FLCD interface at the transferred address.

Figure 21:
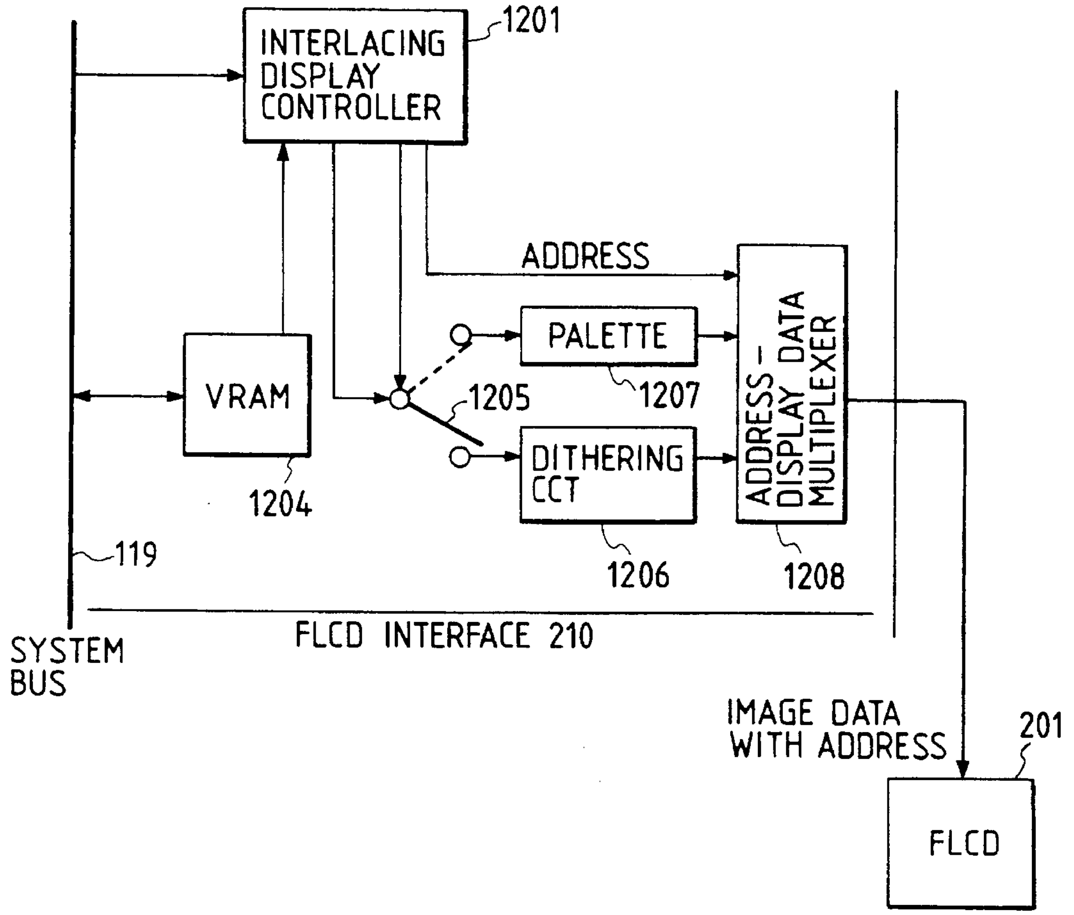
FIG. 21 is a block diagram showing a further structure of the FLCD interface of the second embodiment.

Another example of the structure of the FLCD interface 210 of this embodiment is shown in FIG. 21.

In this example, the processes to be executed by CPU 401 of the FLCD interface shown in FIG. 12 are executed by an interlacing display controller 1201. The flow charts for the FLCD interface 210 shown in FIG. 21 are the same as those shown in FIGS. 15 and 17 to 19.

FIG. 21 is a block diagram showing another example of the structure of the FLCD interface 210 of this embodiment.

In FIG. 21, reference numeral 1201 represents an interlacing display controller which controls the interlacing display. The controller is accessible by the main CPU 101 via the system bus 119. Reference numeral 1204 represents a VRAM accessible both by the main CPU 101 and the interlacing display controller 1201. Reference numeral 1205 represents a dither ON/OFF switch to be turned on or off by the interlacing display controller 1201. This switch determines whether the display data from VRAM 1204 to FLCD 201 is to be subjected to the dither process. Reference numeral 1206 represents a dither operation circuit which performs the dither process for the display data transferred from the interlacing display controller 1201 and outputs the binarized display data to an address/display multiplexer 1208. Reference numeral 1207 represents a color palette which converts the display data transferred from the interlacing display controller 1201 into color data capable of being displayed on FLCD 201 and outputs the color data to the address/display data multiplexer 1208. The multiplexer 1208 multiplexes the display data of one line of FLCD 201 and the address data and outputs the display data with an address to FLCD 201. The display data with an address of one line transferred from the FLCD interface 210 is displayed at the designated address.

The display data output operation of the FLCD interface 210 shown in FIG. 21 will be described. The main CPU 101 writes display data in the form of bit map in VRAM 1204. The main CPU 101 supplies information to the interlacing display controller 1201, the information indicating whether each area of VRAM 1204 is the image data or character data. The interlacing display controller 1201 determines which data in VRAM 1204 is transferred to FLCD 201. The data is then transferred from VRAM 1204 to the palette 1207 or dither operation circuit 1206. The transferred data corresponds to one lateral scan line of FLCD 201. If the display data of VRAM 1204 is image data such as a natural image, the dither process is selected. If the display data of VRAM 1004 is character data, the palette process is selected. The display data is processed by the palette 1207 or dither operation circuit 1206 and transferred to an address/display data multiplexer 1208. The interlacing display controller 1201 transfers the address of the display data on FLCD 201 to the address-display data multiplexer 1208. The multiplexer 1208 multiplexes the display data of one line of FLCD 201 and its address data and outputs the display data with the address to FLCD 201. FLCD 201 displays the display data of one line transferred from the FLCD interface at the transferred address.

Although the present invention is more effective when applied to a ferroelectric liquid crystal, it is not limited only to such ferroelectric liquid crystal display devices.

According to the above-described embodiment, the image data processing can be simplified and speeded up.

(3rd Embodiment)

Figure 22:
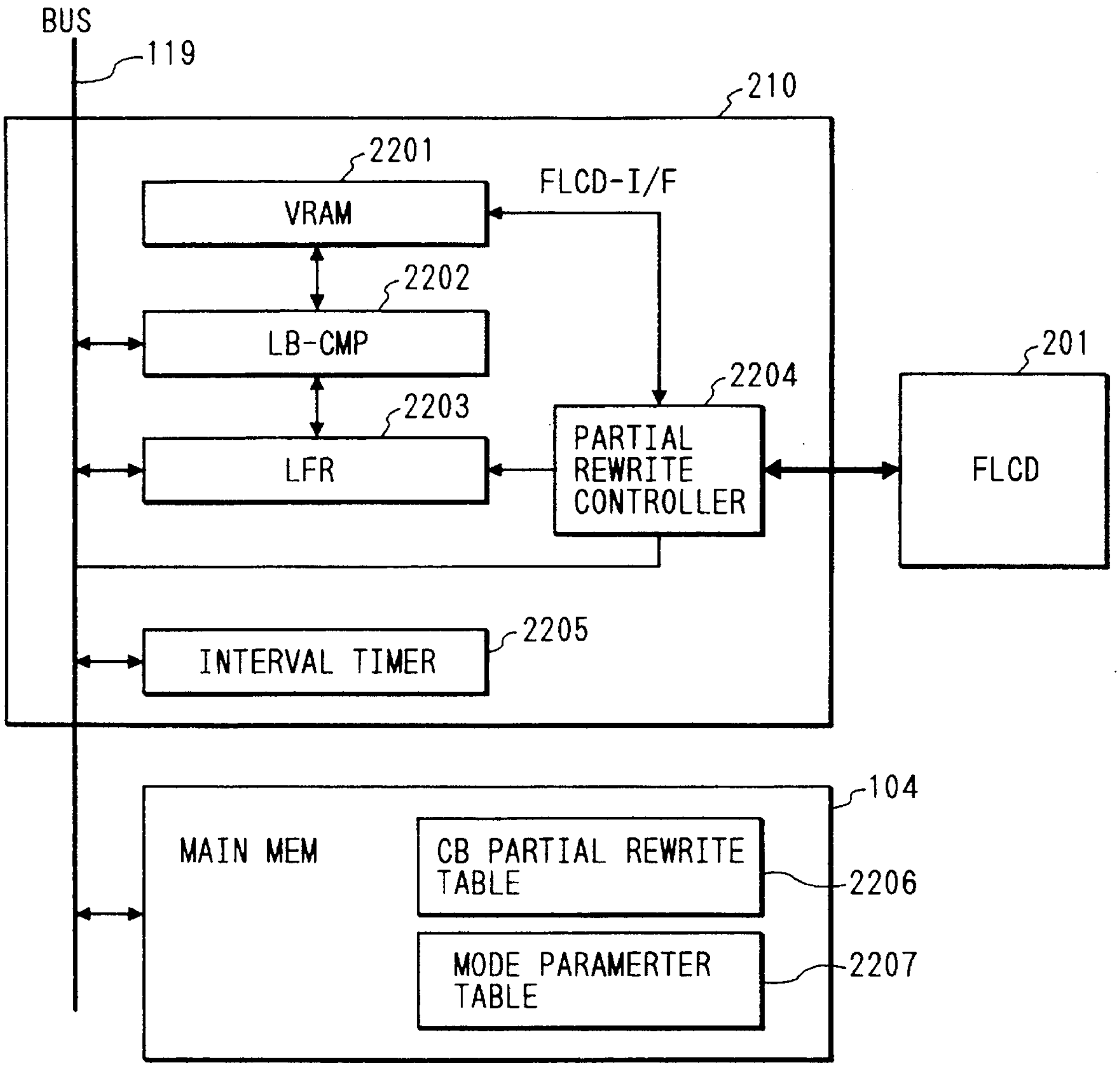
FIG. 22 is a block diagram showing the structure of the FLCD interface of the display controller according to the third embodiment.

FIG. 22 is a block diagram showing the detail of the FLCD interface 210 according to the third embodiment.

Figure 23:
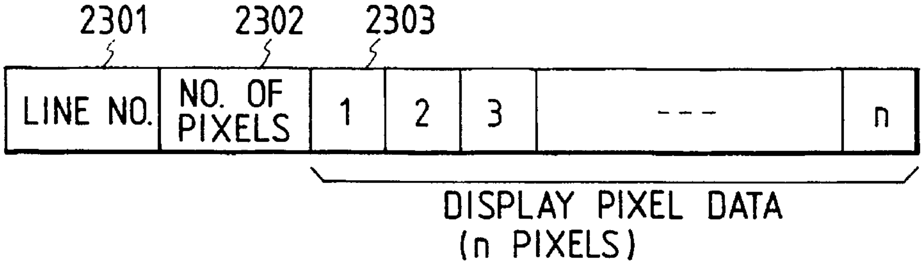
FIG. 23 shows the format of display data transferred to FLCD.
Figure 24:
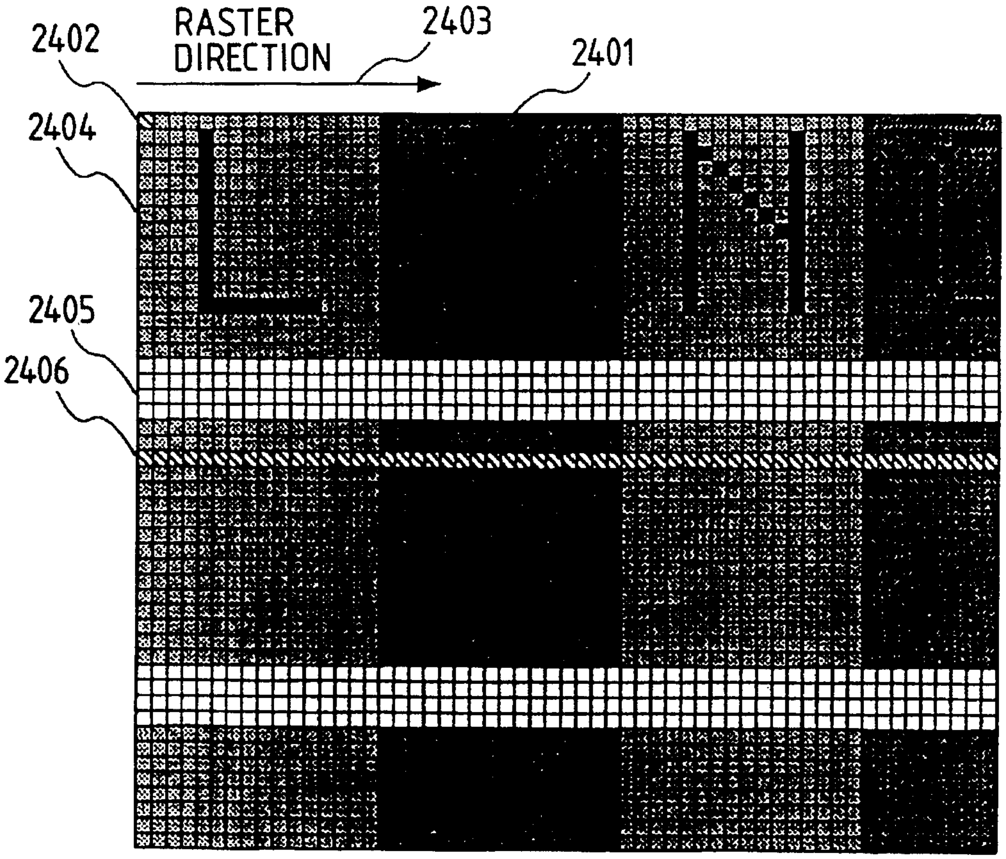
FIG. 24 is an enlarged view of part of the FLCD display screen of the third embodiment.

In FIG. 22, reference numeral 2201 represents a video memory (hereinafter called VRAM where applicable) for temporarily storing character and image information to be displayed on FLCD 201 in the form of code data or bit image data. Reference numeral 2202 represents a line buffer, controller and comparator (hereinafter called LB-CMP where applicable). The line buffer stores display data sent from CPU 101 for the data rewrite on the raster line unit basis. The comparator compares the display data with the old display data in VRAM 2201 to be replaced by the new display data, and outputs "0" if the both display data are the same and "1" if both the display data are different. The controller controls to write the display data in VRAM 2201 after the comparison by the comparator. Reference numeral 2203 represents a partial rewrite line flag register and controller (hereinafter called LFR where applicable). The partial rewrite line flag register stores a flag indicating whether each raster line is to be rewritten (hereinafter called a line flag where applicable. The line flag "1" indicates that the line is to be rewritten, and the line flag "0" indicates that the line is not rewritten). This flag information is sent from LB-CMP 2202. The controller controls to update the line flags of the register and sends and changes the display data upon request from CPU 101 and the partial rewrite controller 2204. The partial rewrite controller 2204 has two operation modes. In the first operation mode, the numbers of all lines are generated from a random number generator or counter to read the display data at the corresponding raster line from VRAM 2201 and send it to FLCD 110 in the data format shown in FIG. 23. The display data format shown in FIG. 23 is for the display data of one line. Reference numeral 2301 represents the line number, reference numeral 2302 represents the number of pixels of one line, and reference numeral 2303 represents a record Comprised of the color and brightness information of each pixel. In the first mode, after the display data for all lines is sent, the completion of the operation is notified to CPU 101 (hereinafter, the first mode is called a refresh display cycle where applicable). In the second mode, the line numbers designated by CPU 101 are randomly or sequentially generated and sent to LFP 2203. After setting the corresponding line flag to "0", in the manner similar to the first mode, the display data at the corresponding raster line is read from VRAM 2201 and sent to FLCD in the data format shown in FIG. 23. In the second mode, after the display data for the lines designated by CPU 101 is sent, the completion of the operation is notified to CPU 101 (hereinafter, the second mode is called a partial rewrite display cycle where applicable). When CPU 101 instructs the second mode during the operation in the first mode, the operation of the first mode is intercepted to execute the first mode. Reference numeral 2205 represents an interval timer which is activated by CPU 101 and whose count value is set by CPU 101. When the count value becomes "0" after the count-down operation, an interrupt event representative of the operation completion is notified to CPU 101.

The detailed operation of the embodiment will be described with reference to FIGS. 24 to 29.

When this system starts, CPU 101 analyzes and executes a boot program in ROM 103. In accordance with the boot program, the system is initialized where necessary, the control procedure program shown in FIGS. 26 to 29 is loaded in the main memory 104, and CPU 101 continues to operate in accordance with the loaded program.

The operation of executing the loaded program will be described with reference to the flow chart shown in FIG. 26. CPU 101 checks whether the operation is immediately after the initialization (Step S501). If immediately after the initialization, a character box partial rewrite information table 2206 in the main memory 104 is initialized (Step S502). At the initialization of Step S502, default values are set to the number N of character boxes within an effective display screen of FLCD 201 in the vertical direction, the number C of lines in one character box, and the number S of vacant lines between character boxes. A partial rewrite character box flag 2409 for each line is set to "0". CPU 101 also sets each flag of the partial rewrite line flag register 2203 to "0". Default display data is outputted to all lines of FLCD 201 to display an initial display screen pattern (Step S503). Then, the control returns to Step S501 and advances to Step S504 because the initialization has been completed. At Step S504, CPU 101 accesses the partial rewrite line flag register 2203 to check which partial rewrite line flag 2407 (hereinafter called LF where applicable) of the register 2203 was rewritten (whether which flag was set to "1").

Figure 27:
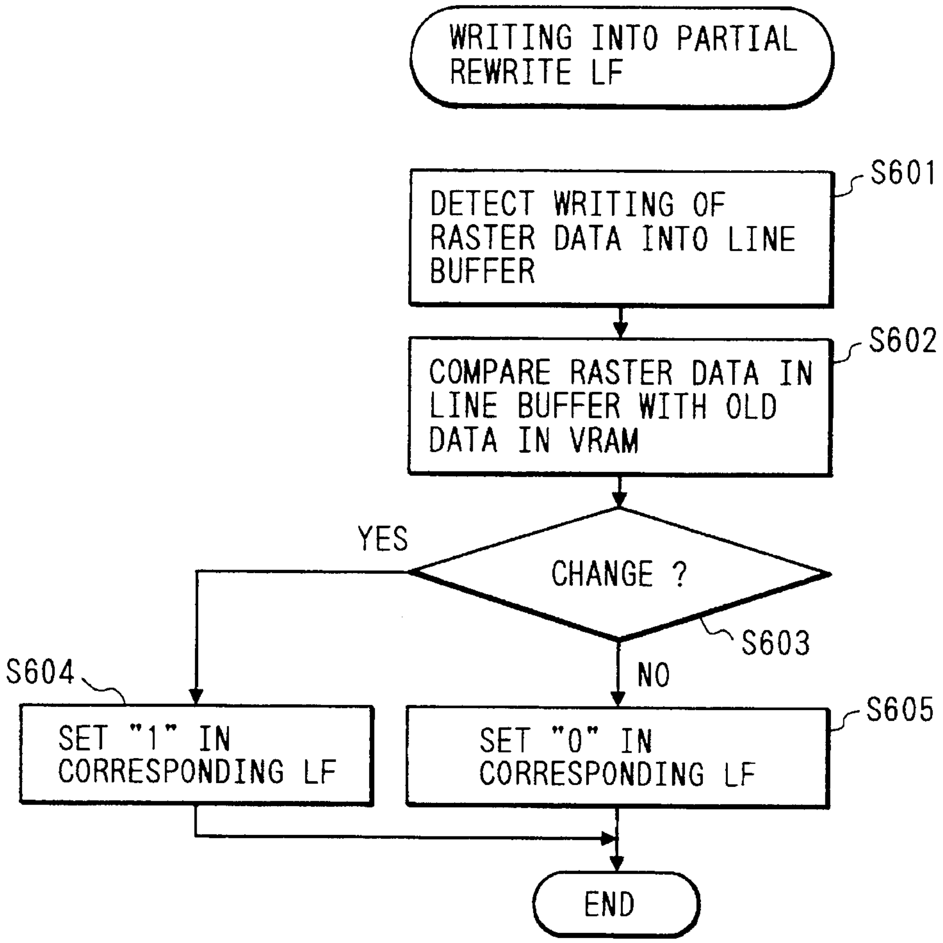
FIG. 27 is a flow chart illustrating the operation of the third embodiment.
Figure 28:
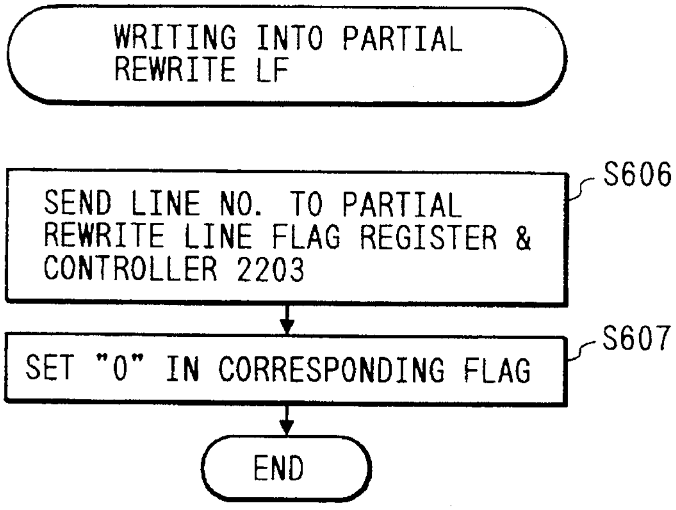
FIG. 28 is a flow chart illustrating the operation of the third embodiment.
Figure 29:
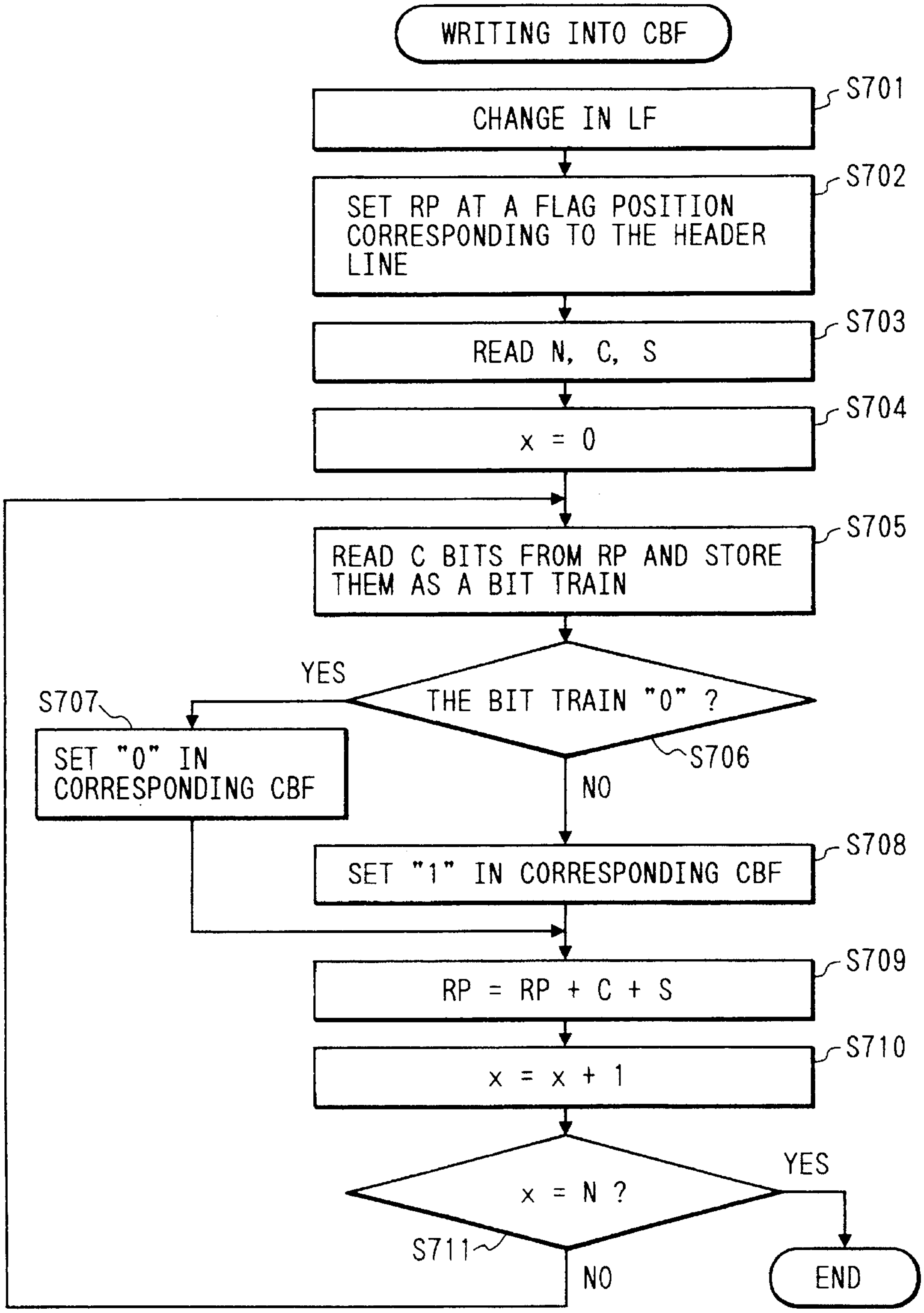
FIG. 29 is a flow chart illustrating the operation of the third embodiment.

How LF 2407 is changed will be described with reference to the flow charts shown in FIGS. 27 and 28. The processes of changing LF 2407 includes the following three cases. The first process is the direct rewrite operation by CPU 101 which is executed for the initialization of LF 2407. The second process is executed when writing display data to the line buffers. Referring to FIG. 27, the line buffer and controller 2202 detects an instruction of writing display data of one line from CPU 101 (Step S601), compares the display data in the line buffer with the old display data in VRAM 2201 to be replaced by the former display data (Step S602). If the comparison result at Step S603 indicates that both the display data are different, the line number along with the signal "1" is sent from the comparator 2202 to the partial rewrite line flag register and controller 2203 to set the corresponding LF 2407 of the register 2203 to "1" and send an interrupt signal indicating a change in LF 2407 to CPU 101 via the interrupt controller 106 (Step S604). If there is no difference between both the display data, the line number along with the signal "0" is sent from the comparator 2202 to the partial rewrite line flag register and controller 2203 to set the corresponding LF 2407 of the register 2203 to "0" (Step S605). The second process is then terminated. The third process is executed when the partial rewrite controller 2204 clears LF 2407 (sets to "1"). Referring to the flow chart shown in FIG. 28, in the case of the partial rewrite to be described later, the partial rewrite controller 2204 sends the line number to the partial rewrite line flag register and controller 2203 immediately before sending the display data along with the line number to FLCD 201 (Step S606). The partial rewrite line flag register and controller 2203 sets the flag of the partial rewrite line flag register corresponding to the received line number to "0" (Step S607). The third process is then terminated. The operations illustrated in FIGS. 27 and 28 are executed by hardware in this embodiment. The operations may be executed by CPU 101 using software. In the example shown in FIGS. 24 and 25, a character string "LMNO . . . " is displayed within character boxes 2404 on a blank (only spaces) display screen 2401, and the content of the register 2203 is shown. It is to be noted that "1" is set to LF 2407 of the newly rewritten line. It is also to be noted that "0" is always set to LF 2407 of vacant lines (indicated by S) between character boxes. Reference numeral 2402 represents a pixel which is the smallest unit of the display screen, reference numeral 2403 represents the raster scan direction, and reference numeral 2406 represents a display line.

Figure 25:
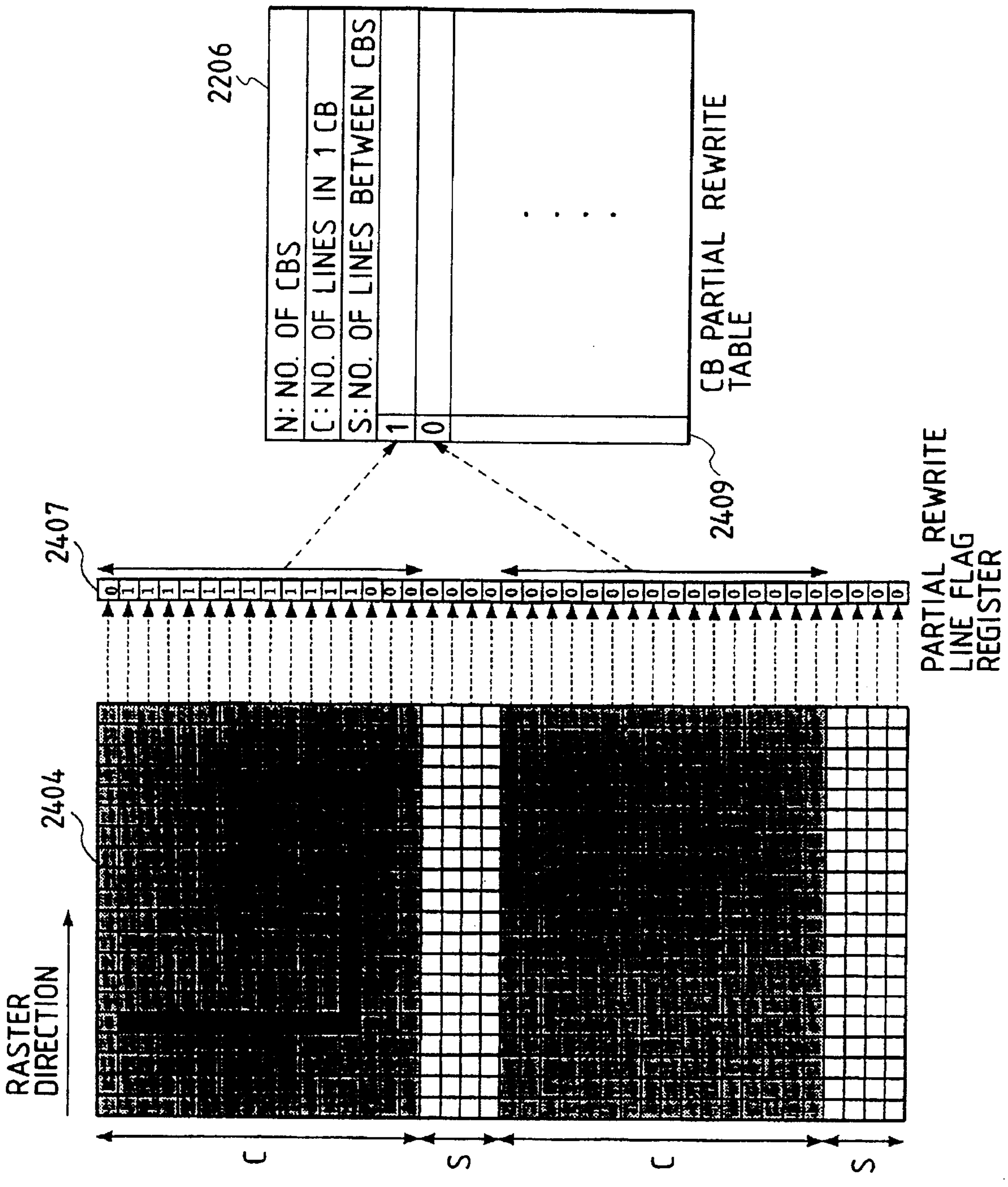
FIG. 25 is a diagram showing the relationship between the display lines, partial rewrite line flags and character box partial rewrite information table of the third embodiment.
Figure 26:
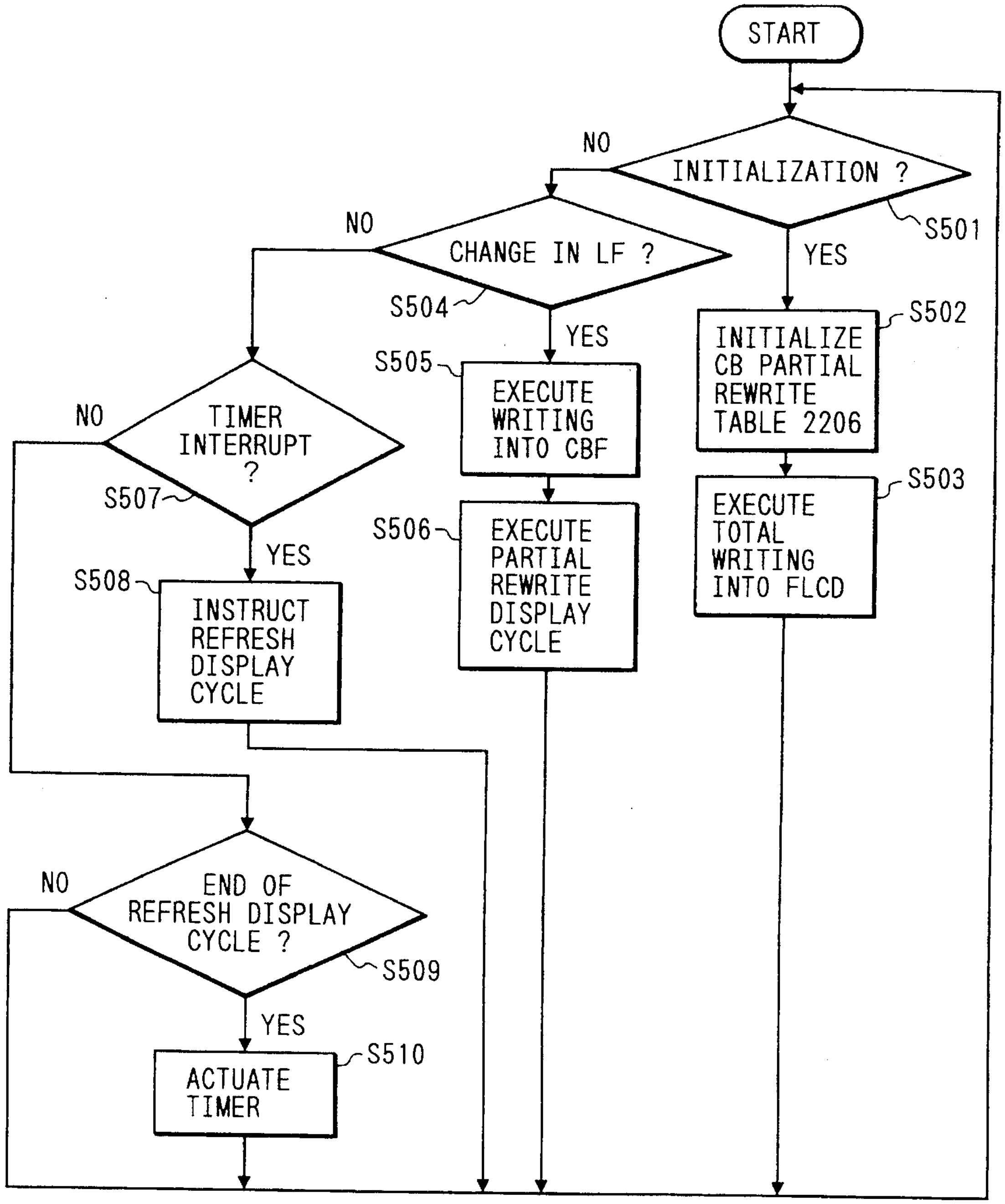
FIG. 26 is a flow chart illustrating the operation of the third embodiment.

Returning back to the flow chart shown in FIG. 26, when CPU 101 detects at Step S504 that there is a change in LF 2407, a process of writing a partial rewrite character box flag (CBF) is executed (Step S505). The detail of Step S505 will be described with reference to the flow chart of FIG. 29. When CPU 101 receives the interrupt signal indicating that "1" was set to LF 2407 (Step S701), the value of a pointer (a logical pointer assigned to the general register of CPU 101) indicating the flag position of the partial rewrite line flag register 2203 corresponding to the line number is set to the flag position of the header line (Step S702). Read next from the character box partial rewrite information table 2206 in the main memory 104 are the number N of character boxes within the effective display screen of FLCD 201 in the vertical direction, the number C of lines of a character box, and the number S of vacant lines between character boxes (Step S703). A logical counter (hereinafter represented by x where applicable) assigned to the general register of CPU 101 is initialized to "0" (Step S704). LFs of C bits are read starting from the position indicated by RP and stored in the accumulator of CPU 101, and other bits except C bits are masked to "0" (Step S705). It is checked whether the content of the accumulator is "0" (Step S706). If "0", the corresponding CBF of the character box partial rewrite information table 2206 is set to "0" (Step S707). If not "0", the corresponding CBF of the character box partial rewrite information table 2206 is set to "1" (Step S708). As shown in FIG. 25, CBF 2409 is a logical sum of partial rewrite line flags constituting one character box. Next, the values C and S are added to the content of RP to make RP represent the next header position of CB (Step S709). The counter x is incremented by "1" (Step S710), and it is checked whether the incremented number indicates the last character box (Step S711). If not, the control returns to Step S705 to repeat the above operations until the last character box is obtained. With the above operations, all CBFs of the rewritten character boxes are set to "1".

Returning again back to the flow chart of FIG. 26, at the next Step S506, CPU 101 searches CBFs 2409 to rewrite display lines constituting CB with CBFs set with "1" in the above-described partial rewrite display cycle (Step S506). In this case, if CPU 101 has already instructed the refresh display cycle, the partial rewrite controller 2204 intercepts the refresh display cycle and executes the partial rewrite display cycle, and after the completion of the partial rewrite display cycle, the refresh display cycle is again executed. The control then returns to Step S501. If there is no change in LF 2407 at Step S504, the control advances to Step S507. If a timer interrupt to be described later occurs, CPU 101 informs the partial rewrite controller 2204 of the refresh display cycle for the whole display screen (Step S508). Next, the control returns to Step S501. If the timer interrupt does not occur at Step S507 and if the refresh display cycle has already been instructed, it is checked at Step S509 whether the refresh display cycle has been completed. If completed, a proper value is set to the interval timer 2205 to actuate it (Step S510). The interval timer is used to activate the next refresh display cycle, the interval value being set to several tens msec to several hundreds msec in this embodiment FLCD 201. The actuated interval timer 2205 starts counting down. When the count reaches "0", a count end interrupt is notified to CPU 101. Next, the control returns to Step S501. If the refresh display cycle has not been completed or if the refresh display cycle has not been instructed, the control returns to Step S501.

In this embodiment, the number N of character boxes within the effective display screen of FLCD 201 in the vertical direction, the number C of lines of a character box, and the number S of vacant lines between character boxes are designated by the default values at the time of starting up this system. These values may be set by an application program running on this system or may be directly set by an operator. The default values may be changed by overwriting the values at the header field of the character box partial rewrite information table 2206.

In the above embodiment, the size of each character box on the display screen is the same. Another embodiment will be described wherein a plurality of character boxes of different sizes are displayed on the same display screen.

The difference of this embodiment using character boxes with different sizes from the third embodiment will be described with reference to FIGS. 30 to 33.

Figure 31:
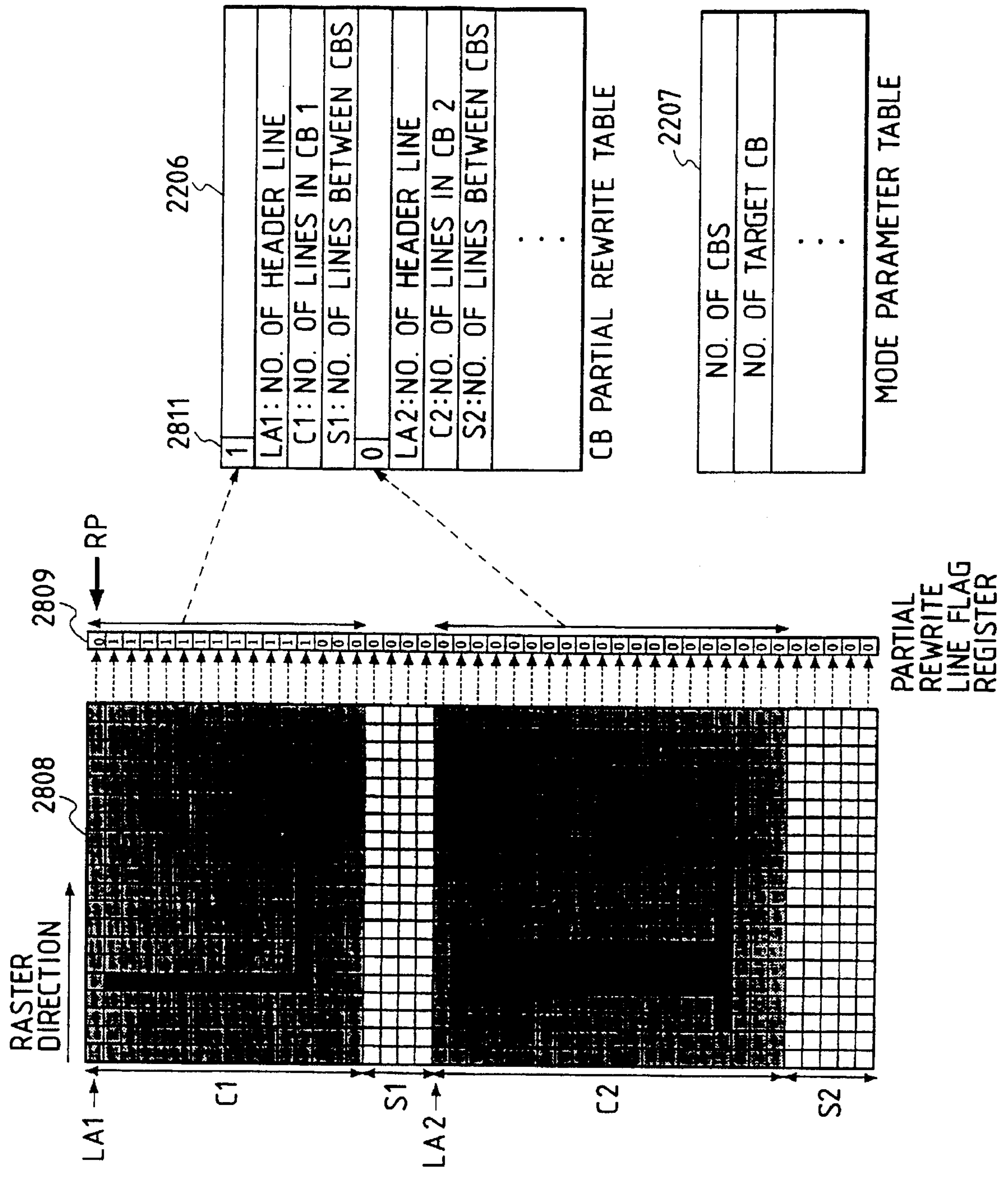
FIG. 31 is a diagram showing the relationship between the display lines, partial rewrite line flags and character box partial rewrite information table of the fourth embodiment.

As shown in FIG. 31, the character box partial rewrite information table 2206 has records corresponding in number to the number of character boxes, each record being constituted by partial rewrite character box flags 2811, the character box header line number LA, the number C of lines of a character box, and the number S of vacant lines between character boxes.

A mode parameter table 2207 is constituted by a field for storing the number N of character boxes within the effective display screen of FLCD 201 in the vertical direction and a field for storing the target character box number during the partial rewrite display cycle.

Figure 32:
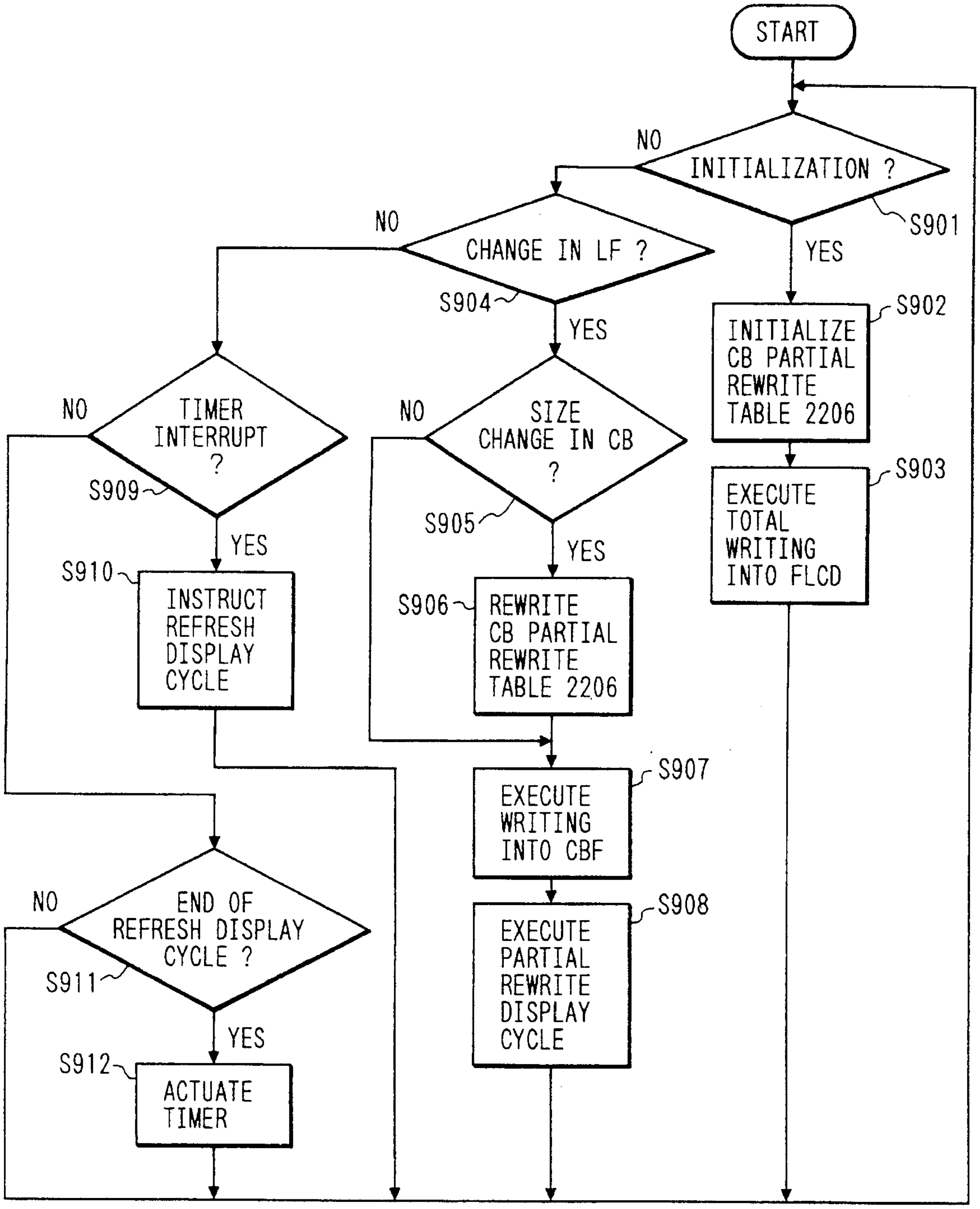
FIG. 32 is a flow chart illustrating the operation of the fourth embodiment.

Different from the flow charts shown in FIG. 26, the flow chart shown in FIG. 32 has new Steps S905 and S906 and the operation at Steps S907 and S908 differs from the corresponding Steps shown in FIG. 26.

At Step S905, it is checked whether the character box size or the number of vacant lines has been requested to change. This change request is effected by a message function shared by the control program of this flow chart and an upper level program for the change request.

If it is judged that a change request has occurred, the character box partial rewrite information table 2206 is rewritten in accordance with the content of the message (Step S906). If there is no change request, the control skips Step S906 and jumps to Step S907.

Figure 33:
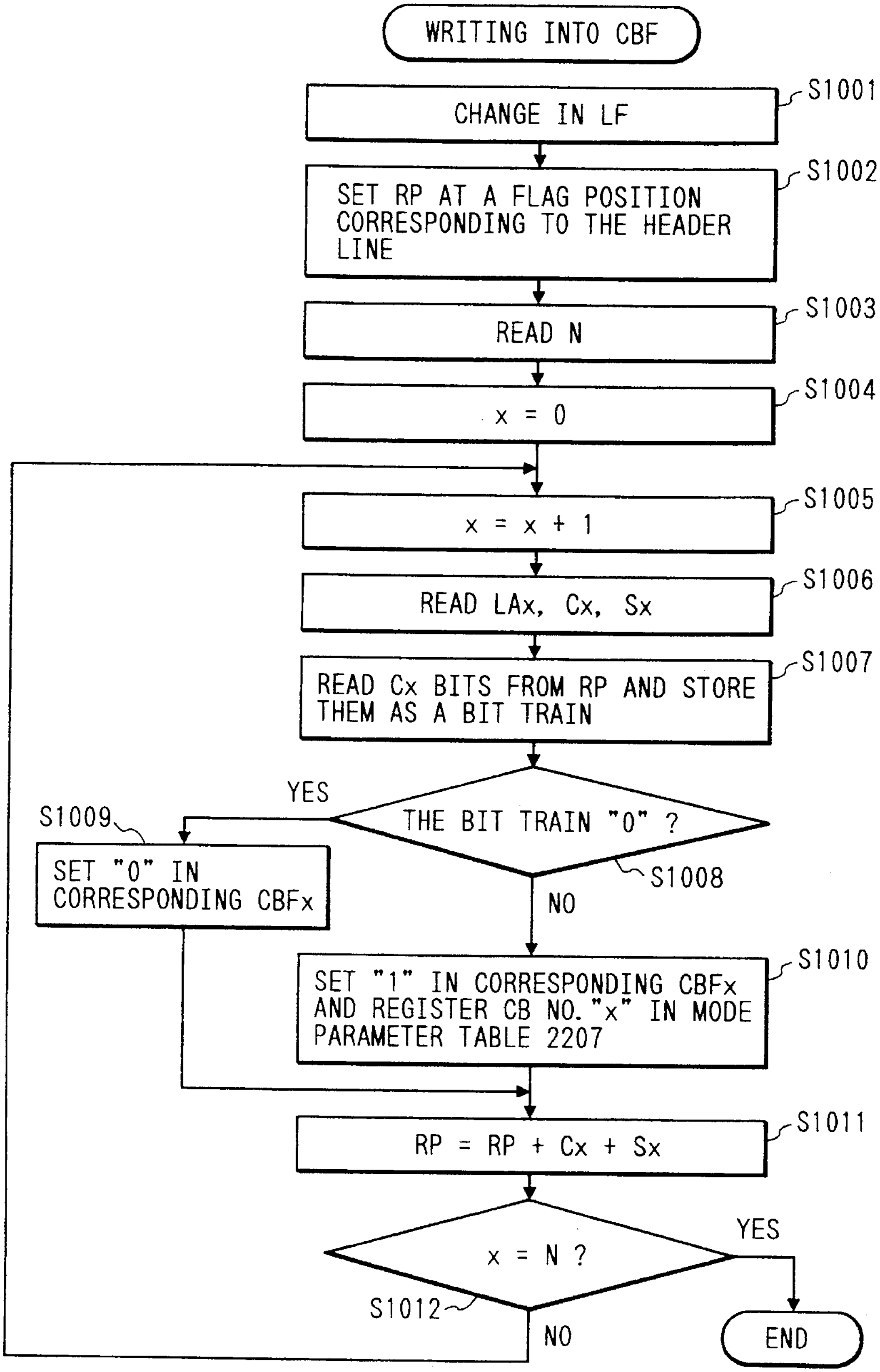
FIG. 33 is a flow chart illustrating the operation of the fourth embodiment.
Figure 34:
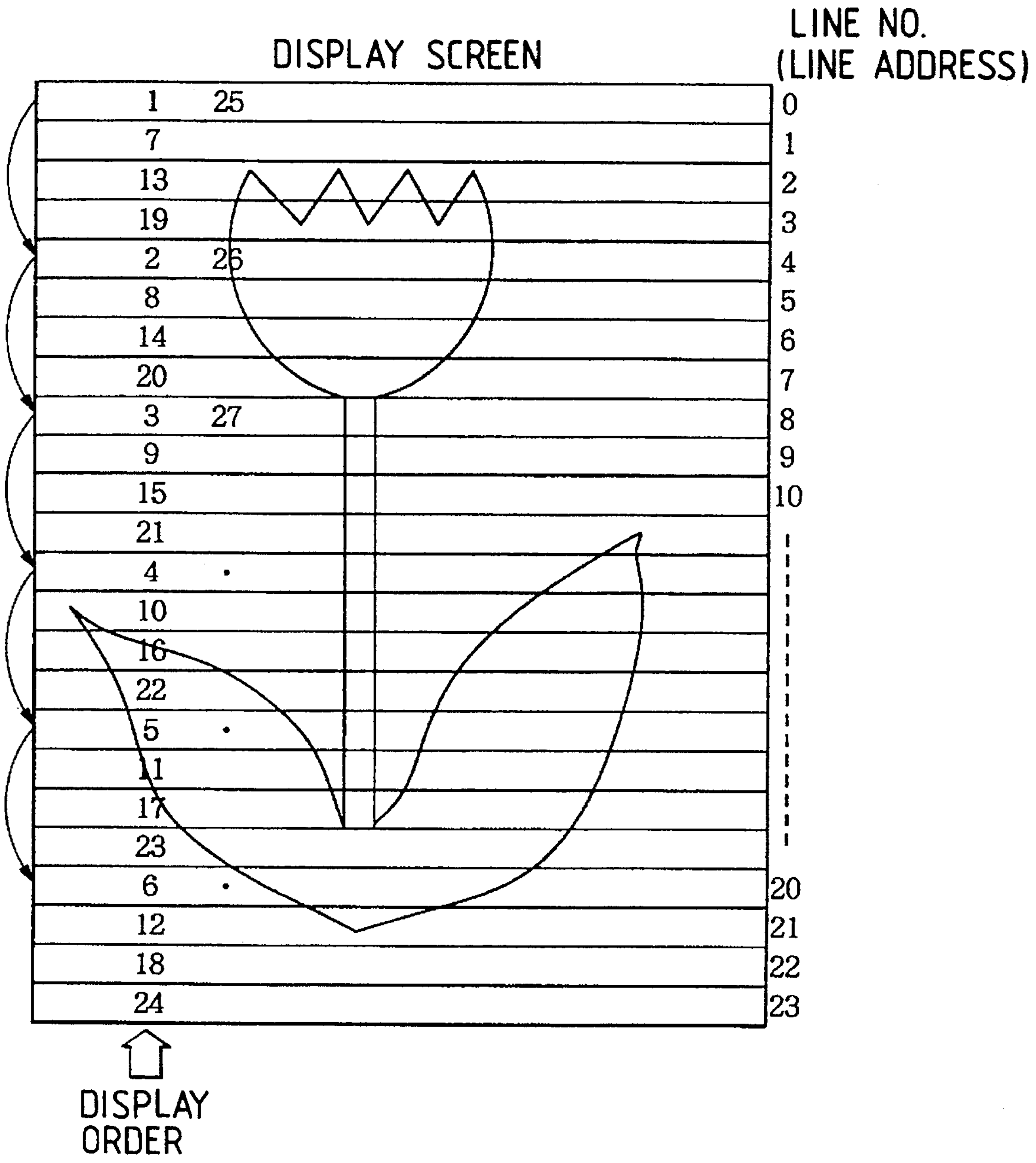
FIG. 34 is a conceptual diagram showing the display screen with the interlacing display.

The operation at Step S907 will be described with reference to FIG. 33.

Upon reception of the interrupt signal indicating that LF has been set to "1" (Step S1001), CPU 101 sets the pointer indicating the flag position of the partial rewrite line flag register 2203 corresponding to the line number, to the flag position corresponding to the header display line (Step S1002). Next, the number N of character boxes within the effective display screen of FLCD 201 in the vertical direction is read from the mode parameter table assigned to the main memory 104 (Step S1003). The counter x assigned to the general register of CPU 101 is initialized to "0" (Step S1004), and the counter x is incremented to "1" (Step S1005). The counter x indicates the current character box number.

Read next from the character box partial rewrite information table 2206 are the header line number LAx for the character box number x, the number Cx of lines of the character box, and the number Sx of vacant lines between character boxes (Step S1006).

LFs of Cx bits are read starting from the position indicated by RP and stored in the accumulator of CPU 101, and other bits except Cx bits are masked to "0" (Step S1007). It is checked whether the content of the accumulator of CPU 101 is "0" (Step S1008). If "0", the corresponding CBFx of the character box partial rewrite information table 2206 is set to "0" (Step S1009). If not "0", the corresponding CBFx of the character box partial rewrite information table 2206 is set to "1" (Step S1010). As shown in FIG. 31, CBFx 2811 is a logical sum of partial rewrite line flags constituting one character box. Next, the values Cx and Sx are added to the content of RP to make RP represent the next header position of CB (Step S1011). It is checked whether it is the last character box (Step S1012). If not, the control returns to Step S1005 to repeat the above operations until the last character box is obtained. With the above operations, all CBFs of the rewritten character boxes are set to "1".

Returning again back to the flow chart of FIG. 32, at Step S908, CPU 101 reads the target character box number from the mode parameter table 2207. Using this character box number as a search key, the header line number of CB, the number of lines, and the number of vacant lines are read from the character box partial rewrite information table 2206, and set to the partial rewrite controller 2204 to instruct the controller to rewrite the display lines in the partial rewrite display cycle. In this case, if CPU 101 has already instructed the refresh display cycle, the partial rewrite controller 2204 intercepts the refresh display cycle and executes the partial rewrite display cycle, and after the completion of the partial rewrite display cycle, the refresh display cycle is again executed.

Figure 30:
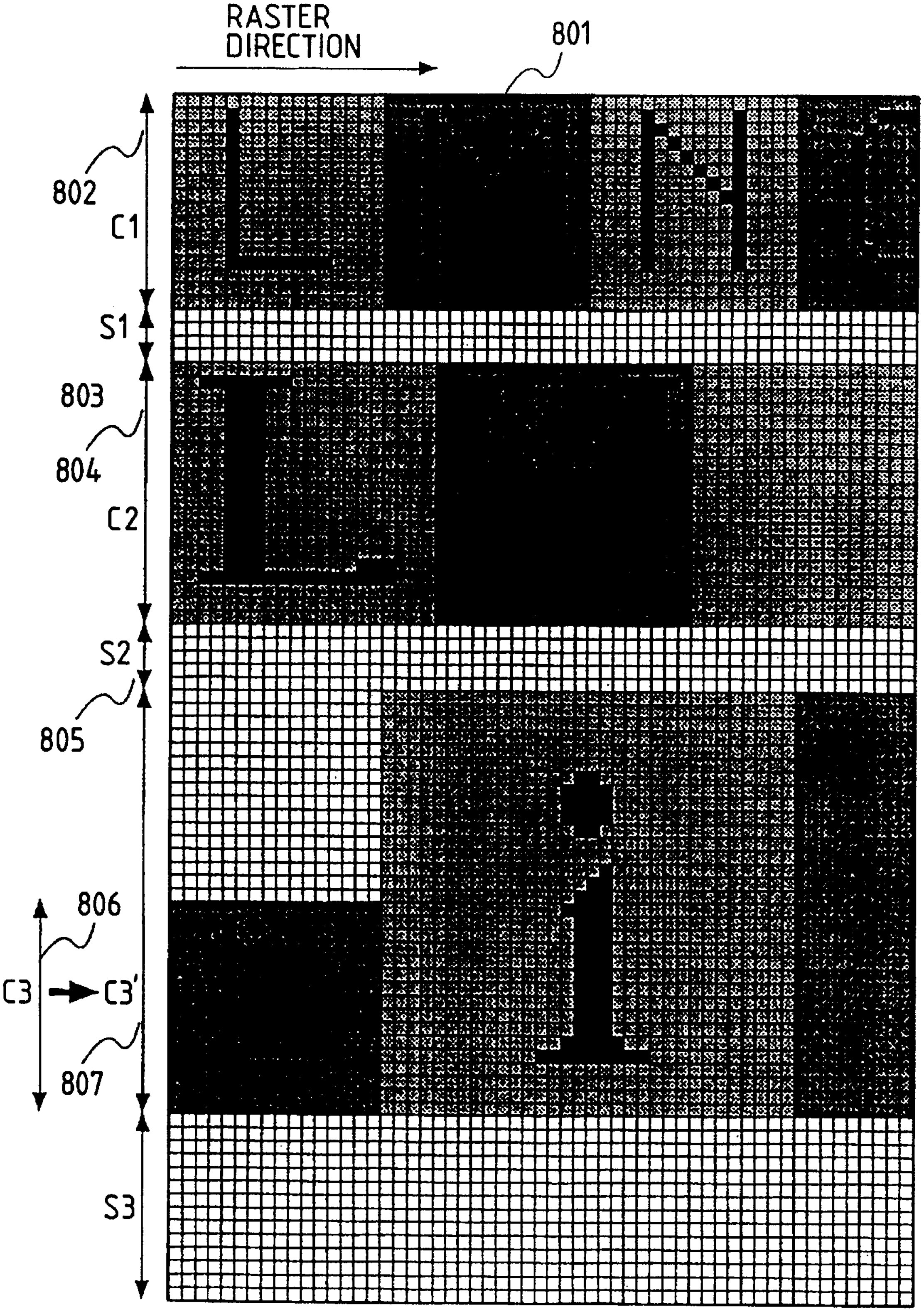
FIG. 30 is an enlarged view of part of the FLCD display screen of the fourth embodiment.

In this embodiment, as shown in FIG. 30, it may consider a case wherein there are difference sizes of character boxes on one display line. For example, if CB having C3' lines is displayed after CB having C3 lines ($C3<C3'$), the CB having C3' lines is enlarged as shown in FIG. 30. The character box partial rewrite information table 2206 is rewritten at Step S906 for the enlarged CB and following CBs. In the case of $C3>C3'$, the character box partial rewrite information table 2206 is not changed. The same control is applied to changing the number Sx of vacant lines.

As described so far, according to this embodiment, it is possible to efficiently perform the partial rewrite which is one of the advantageous features of FLCD. Since the partial rewrite can be performed on the character line unit basis, it is also possible to eliminate the "fluttered display" which is one of the disadvantages of the partial rewrite. Since character lines with different character sizes can be processed, even a complicated text processing system may be introduced. Since lines not used during the partial rewrite display cycle are not accessed, high speed processing is possible.

What is claimed is:

1. A display controller comprising:

storage means for storing data to be displayed on a display;

means for supplying data to said storage means;

a first flag group having plural flags for indicating lines on a display screen of the display corresponding to data supplied by said data supplying means;

a second flag group having plural flags for indicating a plurality of flags of said first flag group;

means for detecting a status of the display;

means for selecting one of said first flag group and said second flag group in accordance with the status of the display detected by said detecting means; and display controlling means for reading data designated by one of said first flag group and said second flag group selected by said selecting means from said storage means, and displaying said data on the display.

2. A display controller according to claim 1, wherein said detecting means detects a temperature of the display.

3. A display controller according to claim 1, wherein each flag of said first flag group indicates a line of the display screen of the display.

4. A display controller according to claim 1, wherein said second flag group includes flags indicating a logical sum of two respective flags of said first flag group.

5. A display controller according to claim 4, wherein said second flag group indicates two consecutive lines of the display screen.

6. A display controller comprising:

changing means for changing a type of data to be displayed in a predetermined size;

reading means for reading display data of a first number of consecutive lines of a display screen of a display, the first number being based on the predetermined size, skipping a second number of consecutive lines of the display screen following the first number of read lines, the second number being an integer multiple of the first number, and reading display data of the first number of consecutive lines of the display screen following the second number of skipped lines; and control means for controlling the display screen to display data read by said reading means and changed by said changing means.

7. A display controller according to claim 6, wherein said changing means performs a binarization process.

8. A display controller according to claim 7, wherein the binarization process comprises a dither process.

9. A display controller comprising:

storage means for storing data to be displayed on a display;

data supplying means for supplying data to said storage means;

flag means having a plurality of flags each for indicating a different line on a display screen of the display;

flag setting means for setting a predetermined value in at least one of the flags of said flag means on the basis of the data supplied by said data supplying means;

detecting means for detecting the at least one of the flags in which the predetermined value is set by said flag setting means; and display controlling means for reading data from said storage means and displaying the data read from said storage means on the display, said data corresponding to a predetermined number of lines including at least one line indicated by the at least one flag detected by said detecting means.

10. A display controller according to claim 9, wherein the predetermined number of lines corresponds to a height of a character.

11. A display controller according to claim 9, wherein the predetermined number of lines corresponds to a size of a binarization process.

12. A display control method comprising the steps of:

storing data in a storage device to be displayed on a display device;

supplying data to the storage device;

indicating, with flags of a first flag group, lines on a display screen of the display device corresponding to data supplied in said data supplying step;

indicating, with a second flag group, a plurality of flags of the first flag group;

detecting a status of the display device;

selecting one of the first flag group and the second flag group in accordance with the status of the display device detected in said detecting step; and reading data designated by one of the first flag group and the second flag group selected in said selecting step from the storage device, and displaying the data on the display device.

13. A display control method according to claim 12, wherein in said detecting step a temperature of the display device is detected.

14. A display control method according to claim 12, wherein each flag of the first flag group indicates a line of the display screen of the display device.

15. A display control method according to claim 12, wherein the second flag group includes flags indicating a logical sum of two respective flags of the first flag group.

16. A display control method according to claim 15, wherein the second flag group indicates two consecutive lines of the display screen.

17. A display control method comprising the steps of:

changing a type of data to be displayed in a predetermined size;

reading display data of a first number of consecutive lines of a display screen of a display, the first number being based on the predetermined size, skipping a second number of consecutive lines of the display screen following the first number of read lines, the second number being an integer multiple of the first number, and reading display data of the first number of consecutive lines of the display screen following the second number of skipped lines; and controlling the display device to display data read in the reading step and changed in the changing step.

18. A display control method according to claim 17, wherein in said changing step a binarization process is performed.

19. A display control method according to claim 18, wherein the binarization process comprises a dither process.

20. A display control method comprising the steps of:

storing data in a storage device to be displayed on a display device;

supplying data to the storage device;

providing a plurality of flags each for indicating a different line on a display screen of the display device;

setting a predetermined value in at least one of the flags on the basis of the supplied data;

detecting the at least one of the flags in which the predetermined value is set; and reading data from the storage device and displaying the data read from the storage device on the display device, the data corresponding to a predetermined number of lines including the at least one line indicated by the at least one flag detected in said detecting step.

21. A display control method according to claim 20, wherein the predetermined number of lines corresponds to a height of a character.

22. A display control method according to claim 20, wherein the predetermined number of lines corresponds to a size of a binarization process.

* * * * *

UNITED STATES PATENT AND TRADEMARK OFFICE

CERTIFICATE OF CORRECTION

PATENT NO. : 5,613,103

DATED : March 18, 1997

INVENTOR(S) : Nobutani et al.

It is certified that error appears in the above-identified patent and that said Letters Patent is hereby corrected as shown below:

COLUMN 9:

Line 13, "Occur" should read --occur--.

COLUMN 14:

Line 60, "Comprised" should read --comprised--.

COLUMN 18:

Line 51, "difference" should read --different--.

Signed and Sealed this

Twenty-eighth Day of October, 1997

Attest:

Bruce Lehman

BRUCE LEHMAN

Attesting Officer

Commissioner of Patents and Trademarks